(12) United States Patent
Moriwaki

(10) Patent No.: US 8,913,221 B2
(45) Date of Patent: Dec. 16, 2014

(54) DISPLAY DEVICE

(75) Inventor: Hiroyuki Moriwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 233 days.

(21) Appl. No.: 13/635,821

(22) PCT Filed: Mar. 31, 2011

(86) PCT No.: PCT/JP2011/001952
§ 371 (c)(1),
(2), (4) Date: Sep. 18, 2012

(87) PCT Pub. No.: WO2011/129065
PCT Pub. Date: Oct. 20, 2011

(65) Prior Publication Data
US 2013/0027648 A1 Jan. 31, 2013

(30) Foreign Application Priority Data
Apr. 16, 2010 (JP) .................. 2010-094876

(51) Int. Cl.
*G02F 1/1343* (2006.01)
*G02F 1/1345* (2006.01)
*G02F 1/1339* (2006.01)
*G02F 1/1362* (2006.01)

(52) U.S. Cl.
CPC ........ *G02F 1/136286* (2013.01); *G02F 1/1345* (2013.01)
USPC ............ 349/139; 349/138; 349/149; 349/153

(58) Field of Classification Search
CPC ............ G02F 1/136286; G02F 1/1345; G02F 1/133345; G02F 1/1339; G02F 2001/13629; G02F 1/1341; G02F 1/1333
USPC ........... 349/139, 155, 138, 149, 153; 345/103
See application file for complete search history.

(56) References Cited

U.S. PATENT DOCUMENTS 7,636,147 B2 * 12/2009 Lee ................. 349/155
7,692,755 B2 * 4/2010 Sugiura et al. ......... 349/155
(Continued)

FOREIGN PATENT DOCUMENTS

JP 2007-34226 A 2/2007
JP 2007-34266 A 2/2007
(Continued)

OTHER PUBLICATIONS

Official Communication issued in International Patent Application No. PCT/JP2011/001952, mailed on May 24, 2011.

*Primary Examiner* — Michael Caley
*Assistant Examiner* — Jia Pan
(74) *Attorney, Agent, or Firm* — Keating & Bennett, LLP

(57) ABSTRACT

A groove is formed above a first group of interconnects of a first substrate, continuously extending along a substrate outer perimeter portion and across the first group of interconnects. An underlying metal is provided in the same layer in which a second group of interconnects are provided, below the groove in at least regions in which the groove overlaps the first group of interconnects as viewed from above.

17 Claims, 20 Drawing Sheets

(56) References Cited

U.S. PATENT DOCUMENTS

| | | | |
|---|---|---|---|
| 2001/0005257 A1* | 6/2001 | Yamada et al. | 349/158 |
| 2001/0019384 A1* | 9/2001 | Murade | 349/110 |
| 2006/0290871 A1 | 12/2006 | Harada | |
| 2007/0279565 A1 | 12/2007 | Iwato et al. | |
| 2007/0296674 A1* | 12/2007 | Aoki et al. | 345/94 |
| 2008/0018848 A1 | 1/2008 | Iwato et al. | |
| 2008/0079001 A1* | 4/2008 | Umezaki et al. | 257/59 |
| 2008/0137022 A1* | 6/2008 | Komeno et al. | 349/153 |
| 2010/0308326 A1* | 12/2010 | Kim et al. | 257/43 |

FOREIGN PATENT DOCUMENTS

| | | |
|---|---|---|
| JP | 2007-322627 A | 12/2007 |
| JP | 2008-026345 A | 2/2008 |
| JP | 2008-145461 A | 6/2008 |

* cited by examiner

DISPLAY DEVICE

TECHNICAL FIELD

The present invention relates to display devices, such as a liquid crystal display device, etc., and more particularly, to a structure around a groove provided in a picture-frame region for controlling a region in which an alignment film is applied.

BACKGROUND ART

Liquid crystal display devices can have a smaller thickness and lower power consumption, and therefore, are widely used as a display for a mobile information apparatus, such as a television set, an OA apparatus (e.g., a personal computer, etc.), a mobile telephone, a personal digital assistant (PDA), etc.

A liquid crystal display device includes a liquid crystal display panel, and a backlight unit attached to the back surface of the liquid crystal display panel. The liquid crystal display panel includes an array substrate including switching elements (e.g., thin film transistors, etc.), and a counter substrate facing the array substrate, which are bonded together by a sealing member. A liquid crystal material is enclosed in a space between the two substrates. The counter substrate is slightly larger than the array substrate, and therefore, a portion of the array substrate is exposed. On such an exposed region (terminal region), a drive circuit is mounted.

The liquid crystal display panel has a display region in which an image is displayed and a non-display region which surrounds the display region.

An alignment film is formed in a surface contacting the liquid crystal layer of the array substrate, covering at least the display region. Similarly, an alignment film is formed in a surface contacting the liquid crystal layer of the counter substrate, covering at least the display region.

The alignment film may be formed by forming a resin film made of polyimide, etc., by flexographic printing, inkjet printing, etc., and performing a rubbing treatment on a surface of the resin film. Inkjet printing is preferably used for the formation of the resin film for the following reasons: the resin film can be applied directly to the substrate; contamination can be reduced due to the non-contact process; the amount of solution consumed can be reduced; the time required can be reduced; etc.

Incidentally, when inkjet printing is used to form the alignment film, a resin material having a lower viscosity than that used in flexographic printing is used as a material for the alignment film, and therefore, the alignment film material is likely to leak and spread into a region around a region (display region) in which the alignment film should be printed. Therefore, if the non-display region around the display region is so small that a large space cannot be ensured between the display region and the sealing member region, the alignment film may flow into the sealing member region. In this case, the adhesiveness between the sealing member and the alignment film is insufficient, and therefore, the gap between the two substrates cannot be completely sealed, so that the liquid crystal material of the liquid crystal layer may leak.

In order to solve the above problem, PATENT DOCUMENT 1 describes a liquid crystal display device including a groove portion which is provided in a generally annular region which is located outside the display region and inside the region in which the sealing member, and extends along an outer perimeter of the display region. With this configuration, even if the liquid resin material applied by inkjet printing spreads to the outside of the display region, the groove portion can reduce or prevent the resin material from further spreading, whereby the spread outside the display region of the alignment film can be reduced or prevented. PATENT DOCUMENT 1 also describes a configuration in which a conductive film, such as an ITO film, etc., is formed on a surface of the groove portion. The liquid resin material which is the alignment film material has a low wettability to the ITO film. Therefore, this configuration allows the groove portion to reduce or prevent the liquid resin material from wetting and spreading.

CITATION LIST

Patent Documents

PATENT DOCUMENT 1: Japanese Patent Publication No. 2007-322627

SUMMARY OF THE INVENTION

Technical Problem

Incidentally, in the liquid crystal display device described in PATENT DOCUMENT 1, the region in which the groove portion is provided extends along the outer perimeter of the display region without overlapping interconnects. Therefore, in the groove portion, an organic film is raised from the bottom of the groove portion into the shape of ridges which extend across the groove portion along lines in which the interconnects are provided. However, the present inventors found the following problem with the liquid crystal display device having the above configuration. Specifically, even if the groove portion is provided along the outer perimeter of the display region, the ridge-shaped raised structure extending across the groove portion is provided, the alignment film material flows through the ridge-shaped raised structure due to surface tension, etc., into the outside of the groove portion. Thus, the leakage of the alignment film into the seal region cannot be sufficiently controlled.

However, in order to remove the ridge-shaped raised structure extending across the groove portion, a groove 102 may be formed to extend across interconnects 101 as shown in a plan view of FIG. 32. In this case, as shown in FIG. 33(a), a conductive film 103 is provided on a surface of the groove, and therefore, conduction is established between the adjacent interconnects 101 via the conductive film 103, and therefore, a short circuit is made when the adjacent interconnects have different potentials.

On the other hand, if the groove 102 is formed without providing the conductive film 103 in order to reduce or prevent a short circuit between the interconnects 101, the interconnects 101 are exposed in the surface, so that the interconnects 101 are easily degraded by corrosion or oxidation. Also, as shown in FIG. 33(b), if conductive foreign matter 104 simultaneously makes contact with any adjacent interconnects 101, a short circuit is made between the interconnects 101. If a conductive bead 105 is present in the region of the groove 102, a leakage current occurs between the exposed interconnect 101 and an electrode 106 of the opposite substrate.

It is an object of the present invention to provide a display device having a narrower picture-frame by reducing or preventing an alignment film material from flowing toward the outside of the substrate during formation of the alignment film and thereby reducing a distance between the alignment film and the sealing member.

Solution to the Problem

In a display device according to the present invention, a first substrate and a second substrate are provided, facing each other. The first substrate includes a substrate body, a first group of interconnects provided on the substrate body, and a second group of interconnects with an insulating film being interposed between the first and second groups of interconnects. In a display region, the first group of interconnects extending in parallel to each other and the second group of interconnects extending in parallel to each other in a direction intersecting the first group of interconnects are provided, and pixels are formed, corresponding to switching elements each formed in the vicinity of a corresponding one of intersections of the first and second groups of interconnects as viewed from above, to display an image. A groove is formed on the first group of interconnects of the first substrate, continuously extending along a substrate outer perimeter portion and across the first group of interconnects. An underlying metal is provided in the same layer in which the second group of interconnects are formed, below the groove in at least regions which the groove overlaps the first group of interconnects as viewed from above.

With the above configuration, the groove is formed on the first group of interconnects, continuously extending along the substrate outer perimeter portion. Therefore, even in a region in which the first group of interconnects are provided, the alignment film material flowing toward the outside of the substrate during formation of the alignment film can be accommodated within the groove, whereby the alignment film material can be reduced or prevented from flowing to the seal region. Therefore, the distance between the alignment film and the sealing member can be reduced, resulting in a display panel having a narrower picture-frame.

Also, with the above configuration, the underlying metal is provided below the groove in at least regions which the groove overlaps the first group of interconnects as viewed from above. Therefore, even if the groove extends across the first group of interconnects, the first group of interconnects are not exposed from the groove surface, or conduction is not established between a conductive film provided on the groove surface and the first group of interconnects. Therefore, it is not likely that a short circuit is made between the first group of interconnects via the conductive film provided on the groove surface or conductive foreign matter existing in the vicinity of the groove surface, or that the first group of interconnects are exposed from the groove surface and are corroded. Also, even if the underlying metal makes contact with the conductive film provided on the groove surface or conductive foreign matter existing in the vicinity of the groove surface, or the first group of interconnects are exposed from the groove surface, the display performance of the display device is not affected, because the underlying metal is not an interconnect which is directly involved in driving of the display device. Therefore, excellent endurance can be obtained.

Moreover, with the above configuration, the underlying metal is provided in the same layer in which the second group of interconnects are provided, and therefore, the underlying metal and the second group of interconnects can be simultaneously formed. Therefore, the underlying metal can be provided without an increase in the number of manufacturing steps.

In the display device of the present invention, the first substrate may have a rectangular shape, and there may be a plurality of the grooves continuously extending in the substrate outer perimeter portion along two sides facing each other of the first substrate.

With the above configuration, the non-display region can be narrowed at the two sides facing each other along which the grooves continuously extend.

In the display device of the present invention, if the grooves continuously extend in the substrate outer perimeter portion along two sides facing each other of the first substrate, the first group of interconnects extending in parallel to each other in the display region, of the first group of interconnects, are preferably gate lines, and regions along the two sides facing each other of a region around the display region of the first substrate are preferably gate terminal regions in which an external connection terminal configured to connect the gate lines to an external circuit is provided.

With the above configuration, the non-display region along the gate terminal region can be narrowed. Also, regions along the other two sides in which the groove is not provided and therefore a wider picture-frame region is provided, can be effectively used as a space for providing a spare interconnect for repairing a source line that takes a different path in the non-display region.

In the display device of the present invention, if the grooves continuously extend in the substrate outer perimeter portion along two sides facing each other of the first substrate, in the second substrate a rib protruding toward the first substrate is preferably formed in each of regions along two sides facing each other of the second substrate, and the two sides correspond to the grooves of the first substrate as viewed from above. In this case, each of the ribs preferably has a protrusion height from a substrate surface which is smaller than or equal to a depth of the corresponding one of the grooves, and a width of the rib which is smaller than a width of the corresponding one of the grooves.

With the above configuration, in the second substrate, a rib protruding toward the first substrate is formed in each of regions along two sides facing each other of the second substrate, and the two sides correspond to the grooves of the first substrate as viewed from above. Therefore, also in the regions along the two sides facing each other of the second substrate, the alignment film material can be effectively reduced or prevented from flowing toward the outside of the substrate during formation of the alignment film. Therefore, due to this as well as the reduction or prevention of flowing out by the grooves in the first substrate, the distance between the alignment film and the sealing member can be further reduced, and therefore, a display panel having a narrower picture-frame can be reliably obtained. Each of the ribs has a protrusion height from the substrate surface which is smaller than or equal to a depth of the corresponding one of the grooves, and a width of the rib which is smaller than a width of the corresponding one of the grooves. Therefore, even in a region in which the rib is provided, a distance between a bottom portion of the groove and a tip end of the rib is larger than or equal to a distance between the first and second substrates. Therefore, even if a pulverized glass fiber material contained as a spacer in the sealing member is present in a region in which the groove and the rib are provided, it is possible to reduce or avoid a situation that the function of the spacer is impaired by the rib and therefore it is difficult to control the cell thickness.

In the display device of the present invention, the groove may be formed in a continuous annular shape and may be provided in the substrate outer perimeter portion to surround the display region.

With the above configuration, the non-display region can be narrowed along the entire substrate outer perimeter portion.

In the display device of the present invention, if the groove is formed in a continuous annular shape and is provided in the substrate outer perimeter portion to surround the display region, in the second substrate an annular rib protruding toward the first substrate and surrounding the display region is preferably formed in a region corresponding to the groove of the first substrate as viewed from above, and the rib preferably has a protrusion height from a substrate surface which is smaller than or equal to a depth of the groove, and a width of the rib which is smaller than a width of the groove corresponding to the rib.

With the above configuration, in the second substrate, an annular rib protruding toward the first substrate and surrounding the display region is formed in a region corresponding to the groove of the first substrate as viewed from above. Therefore, also in the second substrate, the alignment film material can be effectively reduced or prevented from flowing toward the outside of the substrate during formation of the alignment film. Therefore, due to this as well as the reduction or prevention of flowing out by the groove in the first substrate, the distance between the alignment film and the sealing member can be further reduced, and therefore, a display panel having a narrower picture-frame can be reliably obtained. The rib has a protrusion height from the substrate surface which is smaller than or equal to a depth of the groove, and a width of the rib which is smaller than a width of the groove corresponding to the rib. Therefore, even in a region in which the rib is provided, a distance between a bottom portion of the groove and a tip end of the rib is larger than or equal to a distance between the first and second substrates. Therefore, even if a pulverized glass fiber material contained as a spacer in the sealing member is present in a region in which the groove and the rib are provided, it is possible to reduce or avoid a situation that the function of the spacer is impaired by the rib and therefore it is difficult to control the cell thickness.

In the display device of the present invention, the underlying metal may continuously extend along the substrate outer perimeter portion, corresponding to the groove shape.

With the above configuration, the underlying metal continuously extends along the substrate outer perimeter portion, corresponding to the groove shape. Therefore, the underlying metal and the first group of interconnects are not likely to be misaligned or mispositioned, and the underlying metal can be reliably provided between the first group of interconnects and the groove.

In the display device of the present invention, a transfer pad configured to apply a common potential to a common electrode provided on a surface of the second substrate may be formed in a region other than the display region of the first substrate, and the underlying metal may be electrically connected to the transfer pad.

With the above configuration, a continuous annular underlying metal corresponding to the groove shape is provided, and the underlying metal is electrically connected to the transfer pad, whereby the potential of the underlying metal can be maintained at the same common potential as that of the transfer pad. Therefore, for example, even if conduction is established between the common electrode on a surface of the second substrate and the underlying metal via a transfer member (e.g., conductive beads, etc.) contained in the sealing member, an image defect is not likely to occur due to that conduction.

In the display device of the present invention, there may be a plurality of the transfer pads, and the underlying metal may be electrically connected to each of the plurality of transfer pads, and may also be connected to an external connection terminal to which a common potential is applied.

With the above configuration, the underlying metal is electrically connected to each of the plurality of transfer pads, and is also connected to an external connection terminal to which a common potential is applied. Therefore, the common potential applied from the external connection terminal to the underlying metal can be directly transferred to each transfer pad. In other words, the underlying metal can also serve as a transfer bus line for applying a common potential to each transfer pad, and therefore, the picture-frame can be further narrowed than when the transfer bus line is provided around a region in which the transfer pads are provided, for example.

In the display device of the present invention, there may be a plurality of the underlying metals, and the plurality of the underlying metals may be spaced apart from each other in an island pattern, and correspond to respective regions in which the first group of interconnects and the groove overlap each other as viewed from above.

With the above configuration, the plurality of the underlying metals are spaced apart from each other in an island pattern, and correspond to respective regions in which the first group of interconnects and the groove overlap each other as viewed from above, and therefore, even if conduction (defect) is established between one underlying metal and one interconnect of the first group at some point, the defect does not affect other underlying metals.

In the display device of the present invention, the underlying metal may not be electrically connected to other interconnects and may be in a floating state.

With the above configuration, the underlying metal is not electrically connected to other interconnects and is in a floating state. Therefore, for example, even if conduction is established between the common electrode on a surface of the second substrate and the underlying metal via a transfer member (e.g., conductive beads, etc.) contained in the sealing member, an image defect is not likely to occur due to that conduction.

In the display device of the present invention, a silicon film may be provided in a region which is located below the underlying metal and above the insulating film.

With the above configuration, a silicon film is provided in a region which is located below the underlying metal and above the insulating film. Therefore, even if a thickness of the insulating film or the underlying metal above the first group of interconnects decreases at side surfaces of the first group of interconnects, it is possible to reduce or avoid a situation that the thinner portion of the insulating film or the underlying metal is broken, so that the first group of interconnects are exposed from the surface. Also, if a transparent conductive film is provided on the groove surface, it is possible to reduce or avoid a situation that the transparent conductive film infiltrates from the broken portion of the thinner insulating film or underlying metal, so that conduction is established between the transparent conductive film and the first group of interconnects. Therefore, a short circuit is not likely to occur between the first group of interconnects.

Also, with the above configuration, the silicon film can be formed simultaneously with formation of a silicon film included in switching elements (for example, TFTs) in the display region. Therefore, the silicon film can be provided without an increase in the number of manufacturing steps.

In the display device of the present invention, the groove surface may be covered by a transparent conductive film.

With the above configuration, the groove surface is covered by a transparent conductive film. Therefore, the underlying metal is not exposed from the groove surface, and therefore, the underlying metal can be reduced or prevented from being corroded or degraded.

Also, the underlying metal may be exposed from the groove surface.

With the above configuration, the underlying metal is exposed from the groove surface. Therefore, the picture-frame can be further narrowed than when the groove surface is covered by the transparent conductive film, by an amount corresponding to a region in which the transparent conductive film would otherwise be provided.

In the display device of the present invention, the second group of interconnects may be formed of a Ti film and a Cu film put on top of the Ti film.

Also, the second group of interconnects may be formed of a Ti film and an Al film put on top of the Ti film.

In the display device of the present invention, a liquid crystal layer may be provided between the first and second substrates.

Advantages of the Invention

According to the present invention, the groove is formed in the first substrate, continuously extending along the substrate outer perimeter portion. Therefore, the alignment film material can be effectively reduced or prevented from flowing toward the outside of the substrate during formation of the alignment film. Therefore, the distance between the alignment film and the sealing member can be reduced, resulting in a display panel having a narrower picture-frame.

Also, according to the present invention, the underlying metal is provided below the groove in at least regions which the groove overlaps the first group of interconnects as viewed from above. Therefore, even if the groove extends across the first group of interconnects, the first group of interconnects are not exposed from the groove surface, or conduction is not established between a conductive film provided on the groove surface and the first group of interconnects. Therefore, it is not likely that a short circuit is made between adjacent interconnects of the first group via the conductive film provided on the groove surface or conductive foreign matter existing in the vicinity of the groove surface, or that the first group of interconnects are exposed from the groove surface and are corroded. Also, even if the underlying metal makes contact with the conductive film provided on the groove surface or conductive foreign matter existing in the vicinity of the groove surface, or the first group of interconnects are exposed from the groove surface, the display performance of the display device is not affected, because the underlying metal is not an interconnect which is directly involved in driving of the display device. Therefore, excellent endurance can be obtained.

DESCRIPTION OF EMBODIMENTS

Embodiments of the present invention will be described in detail hereinafter with reference to the accompanying drawings. In first to third embodiments described below, an active matrix drive type liquid crystal display device including a thin film transistor (TFT) for each pixel will be described as an example display device. Note that the present invention is not intended to be limited to these embodiments and may have other configurations.

First Embodiment

Figure 1:
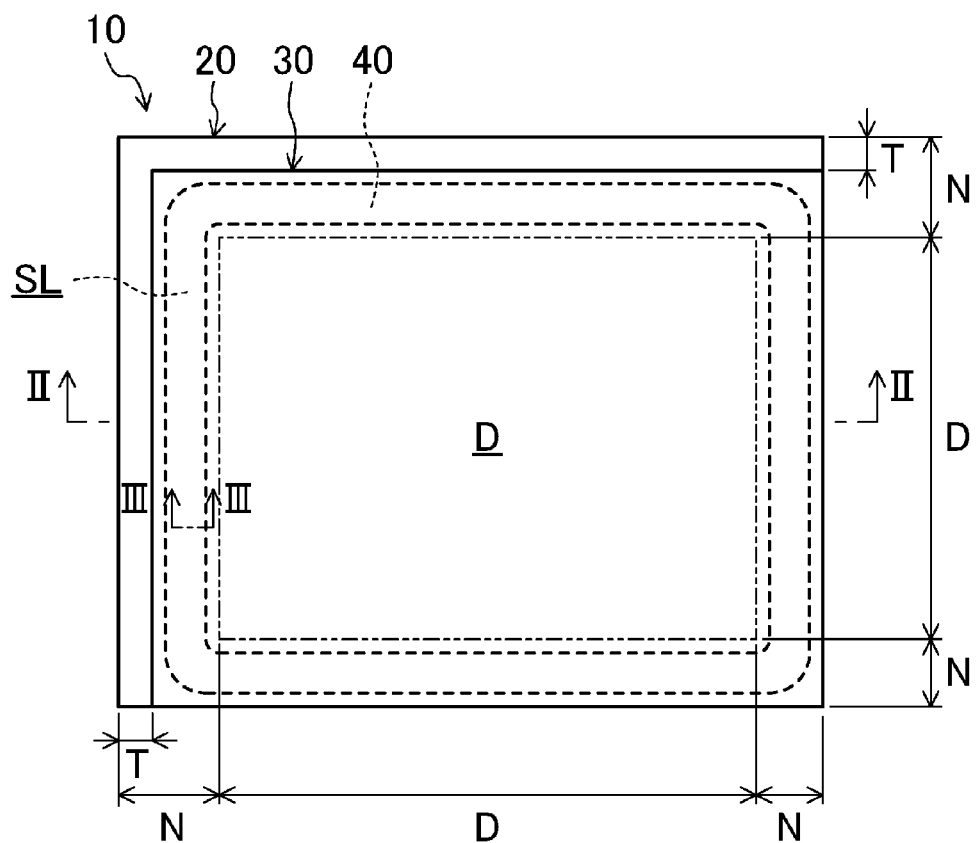
FIG. 1 is a plan view of a liquid crystal display device according to a first embodiment.
Figure 2:
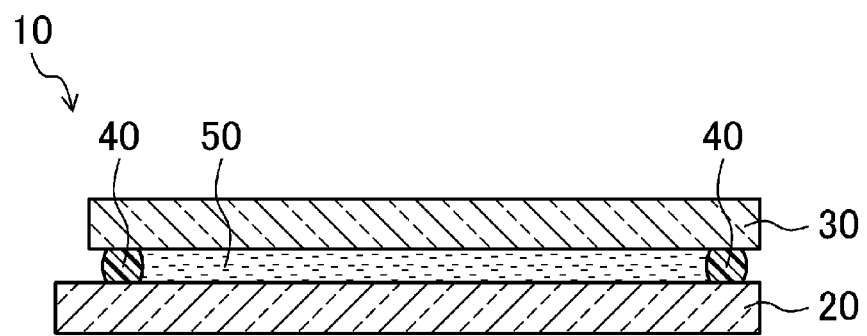
FIG. 2 is a cross-sectional view taken along line II-II of FIG. 1.
Figure 3:
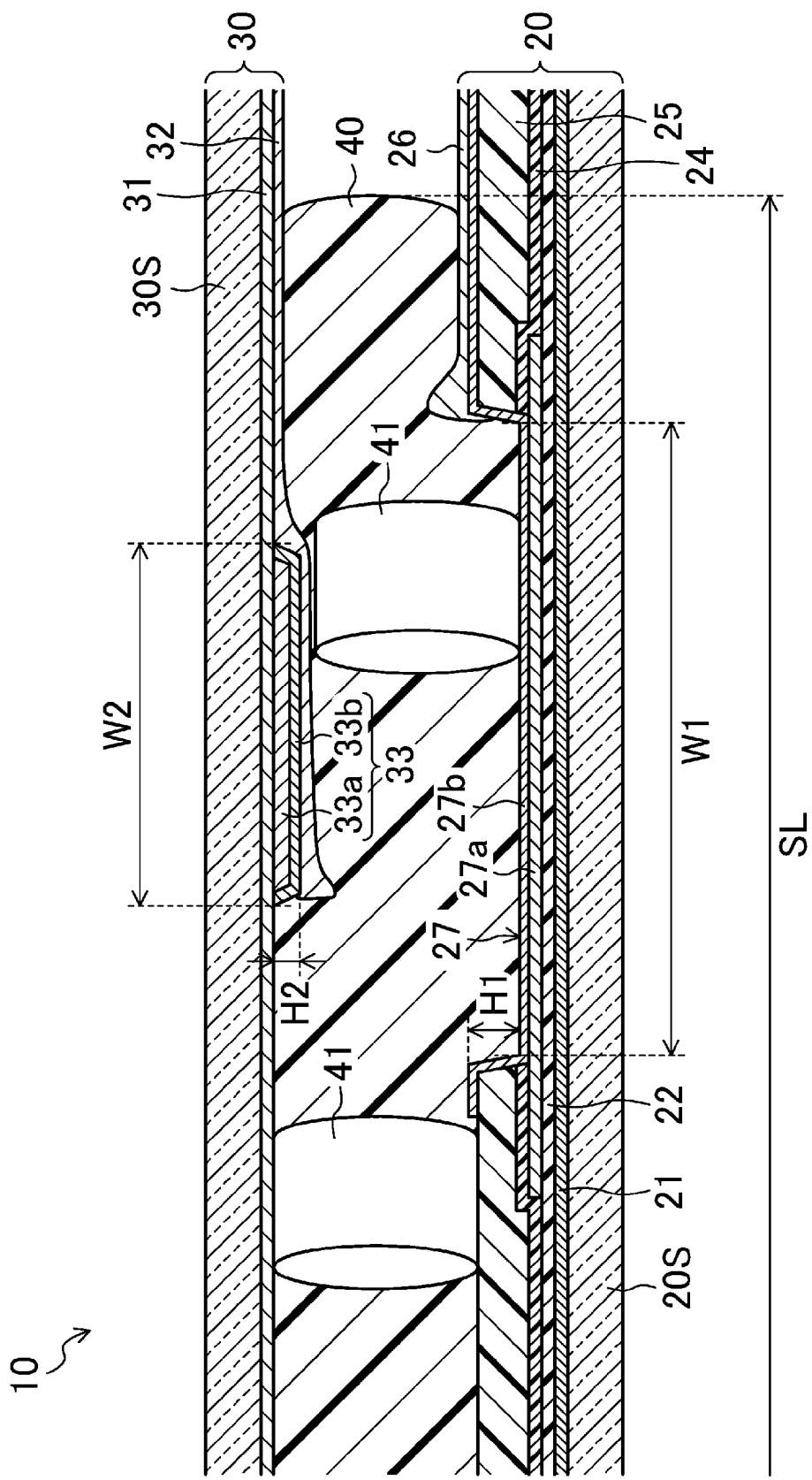
FIG. 3 is a cross-sectional view taken along line III-III of FIG. 1.
Figure 4:
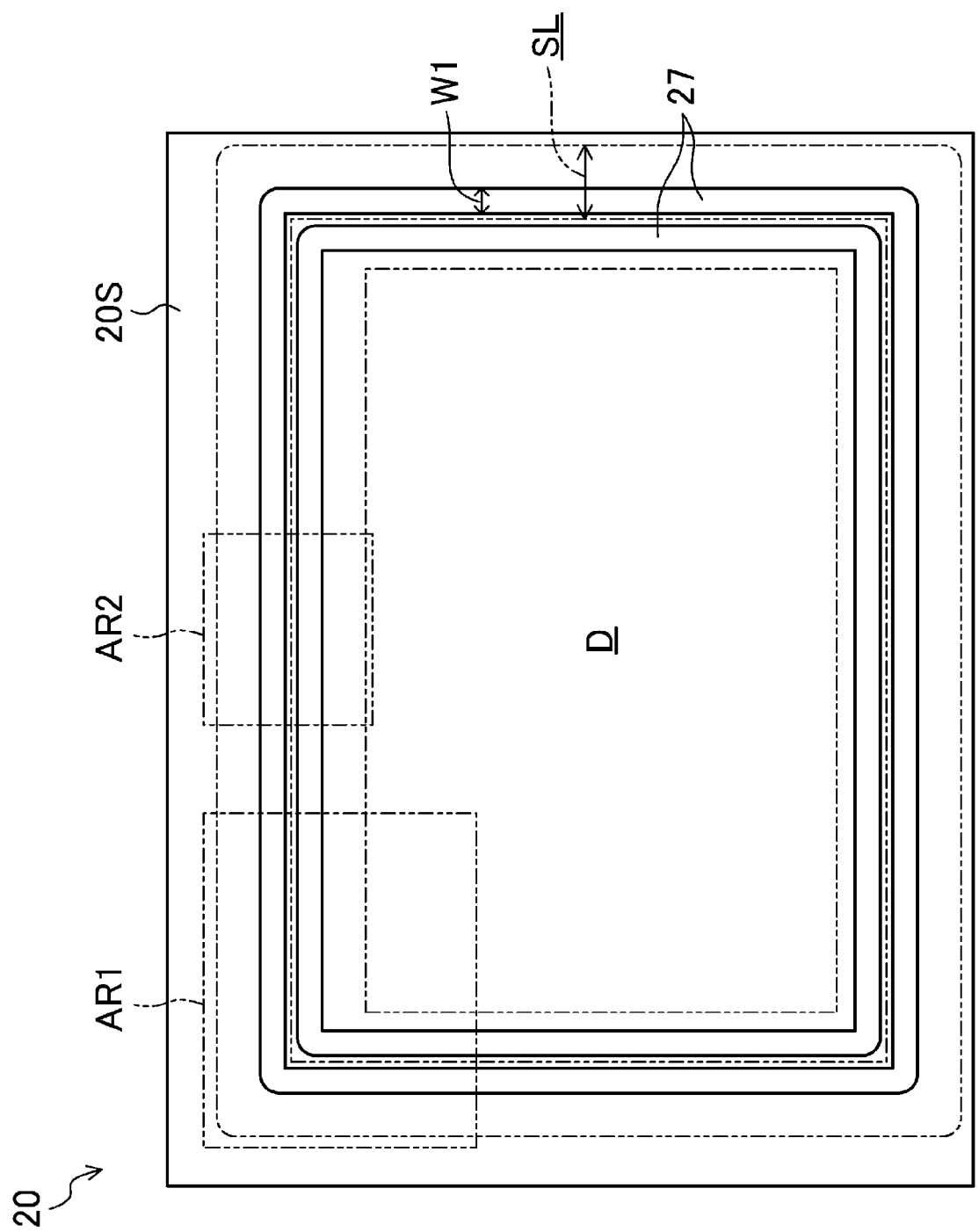
FIG. 4 is a plan view of an array substrate.
Figure 5:
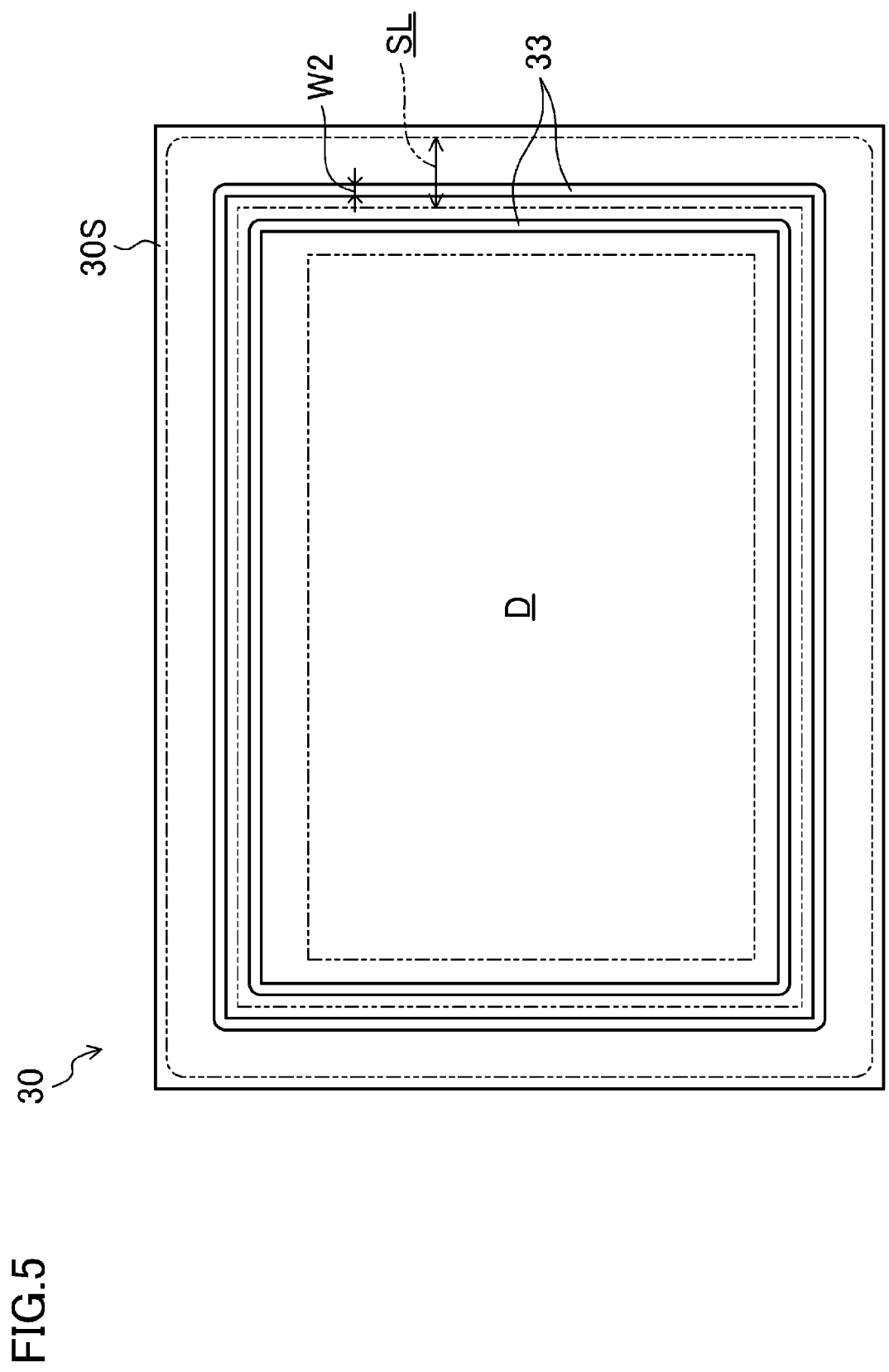
FIG. 5 is a plan view of a counter substrate.

FIGS. 1 and 2 schematically show an entire liquid crystal display device 10 according to a first embodiment. FIG. 3 is an enlarged cross-sectional view of the liquid crystal display device 10 in the vicinity of a seal region SL thereof. FIGS. 4 and 5 are plan views of an array substrate 20 and a counter substrate 30, respectively.

Figure 6:
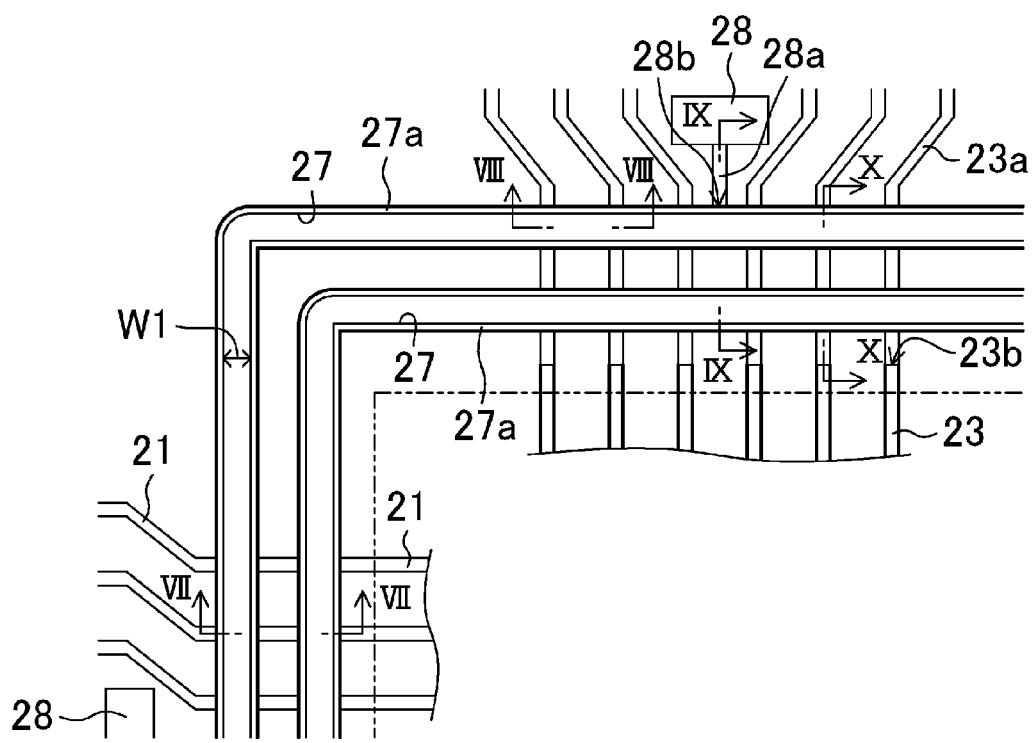
FIG. 6 is an enlarged plan view of a region AR1 of FIG. 4.

The liquid crystal display device 10 includes the array substrate 20 (first substrate) and the counter substrate 30 (second substrate), which face each other. The array substrate 20 includes a first metal (first group of interconnects) including gate lines 21, a gate insulating film 22, a second metal (second group of interconnects) including source lines 23 (see FIG. 6), a passivation film 24, a planarization film 25, a third metal including pixel electrodes (not shown), and an alignment film 26, which are formed and stacked together on a substrate body 20S. A detailed configuration of the array substrate 20 will be described below. The counter substrate 30 includes a common electrode 31, a color filter and a black matrix (not shown), and an alignment film 32, which are formed and stacked together on a substrate body 30S. A region (not shown) in which light is blocked by the black matrix is provided in a non-display region N located at a substrate outer perimeter portion. The array substrate 20 and the counter substrate 30 are bonded together by a frame-shaped sealing member 40 provided in their outer perimeter portions (the seal region SL). A liquid crystal layer (display layer) 50 is provided in a space between the substrates 20 and 30 surrounded by the sealing member 40, to form a display region D. A portion of the non-display region N around the display region D serves as a terminal region T in which external connection terminals (parts mounted, etc.) are attached.

Note that, as shown in FIG. 4, in the array substrate 20, an annular groove 27 is provided around the display region D in the same layer in which the passivation film 24 and the planarization film 25 are provided. The groove 27 reduces or prevents from a liquid resin material for the alignment film 26 from flowing from the display region D to the non-display region N during formation of the alignment film 26. One or a plurality of the grooves 27 may be provided (two grooves in FIG. 4). On the other hand, in the counter substrate 30, as shown in FIG. 5, an annular rib 33 is provided around the display region D to reduce or prevent a liquid resin material for the alignment film 32 from flowing from the display region D to the non-display region N during formation of the alignment film 32. One or a plurality of the ribs 33 may be provided (two ribs in FIG. 5). The rib 33 is positioned to correspond to the region of the groove 27 provided in the array substrate 20 so that the groove 27 and the rib 33 can fit and stack together. The groove 27 and the rib 33 are provided in the two substrates to reduce or prevent the liquid resin materials for the alignment films 26 and 32 from flowing out, whereby distances between the alignment films 26 and 32 and the sealing member 40 can be reduced, i.e., a narrower picture-frame can be provided.

For example, the groove 27 has a width of about 50 µm (W1 of FIG. 3) and a depth of about 2.5 µm (H1 of FIG. 3). For example, the rib 33 has a width of about 30 µm (W2 of FIG. 3) and a protrusion height of about 2.0 µm from the substrate surface (H2 of FIG. 3). The sealing member 40 contains a pulverized glass fiber material 41 (fiber diameter: about 4.0 µm, for example) whose fiber diameter is set to a distance between the array substrate 20 and the counter substrate 30, as a spacer for providing a uniform distance between the two substrates. When the rib 33 is provided in the non-display region N of the counter substrate 30, then if the pulverized glass fiber material 41 is present in a region in which the rib 33 is provided, the distance between the two substrates is the sum of the fiber diameter of the pulverized glass fiber material 41 and the height of the rib 33, and therefore, it is likely to be difficult to control the cell thickness. However, the groove 27 and the rib 33 are positioned so that the groove 27 and the rib 33 fit together, and the protrusion height (H2) from the substrate surface of the rib 33 is set to be smaller than or equal to the depth (H1) of the groove 27, and the width (W2) of the rib 33 is set to be smaller than the width (W1) of the groove 27 corresponding to the rib 33. Therefore, even if the rib 33 is provided in the counter substrate 30, a distance between a bottom portion of the groove 27 and a tip end of the rib 33 is larger than or equal to the distance (i.e., the fiber diameter of the pulverized glass fiber material 41) between the array substrate 20 and the counter substrate 30, and therefore, a sufficient space is ensured so that the pulverized glass fiber material 41 can exist. This helps to reduce or avoid a situation that the pulverized glass fiber material 41 is stuck due to the rib 33, so that the function of the spacer is impaired and therefore it is difficult to control the cell thickness.

The liquid crystal display device 10 is configured so that when the TFT is turned on in a pixel, a potential difference occurs between the pixel electrode and the common electrode 31, whereby a predetermined voltage is applied to a liquid crystal capacitor formed of the liquid crystal layer 50. In the liquid crystal display device 10, an image is displayed by adjusting the transmittance of external incident light by utilizing the phenomenon that the alignment of liquid crystal molecules varies depending on the magnitude of the applied voltage.

A detailed configuration of the array substrate 20 will be described with reference to FIGS. 6-10. Note that, in FIG. 6, the passivation film 24, the planarization film 25, the third metal, etc. are not shown for ease of illustration of the interconnects, and the first and second metals are shown by solid lines for the sake of convenience (the same applies to FIGS. 11, 13, 15, and 19 described below).

A large number of the gate lines 21 (scan signal interconnects) extending in parallel to each other and a large number of the source lines 23 (video signal interconnects) extending in parallel to each other are provided on the array substrate 20 in the display region D. The source line 23 and the gate line 21 are insulated from each other in the substrate thickness direction by the gate insulating film 22, and extend in intersecting directions (e.g., at right angles). A TFT (not shown) serving as a switching element is provided in the vicinity of each intersection as viewed from above. The liquid crystal display device 10 has pixels corresponding to the respective TFTs to display an image.

The gate lines 21 are formed of the first metal. The source lines 23 are made of the second metal. The first and second metals are each formed, for example, of a Ti film (thickness: about 30 nm) and a Cu film (thickness: about 100 nm) put on top of the Ti film.

Figure 7:
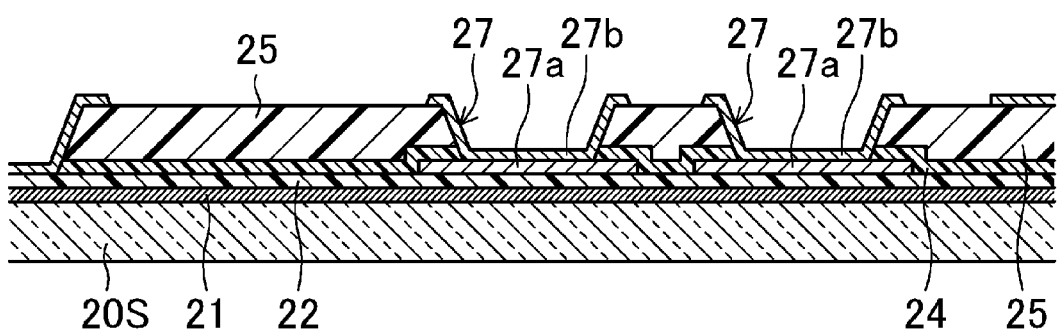
FIG. 7 is a cross-sectional view taken along line VII-VII of FIG. 6.
Figure 8:
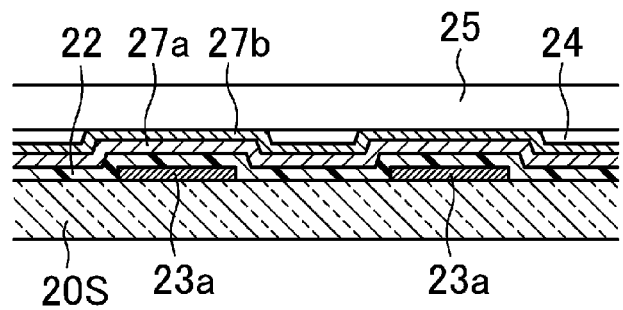
FIG. 8 is a cross-sectional view taken along line VIII-VIII of FIG. 6.
Figure 10:
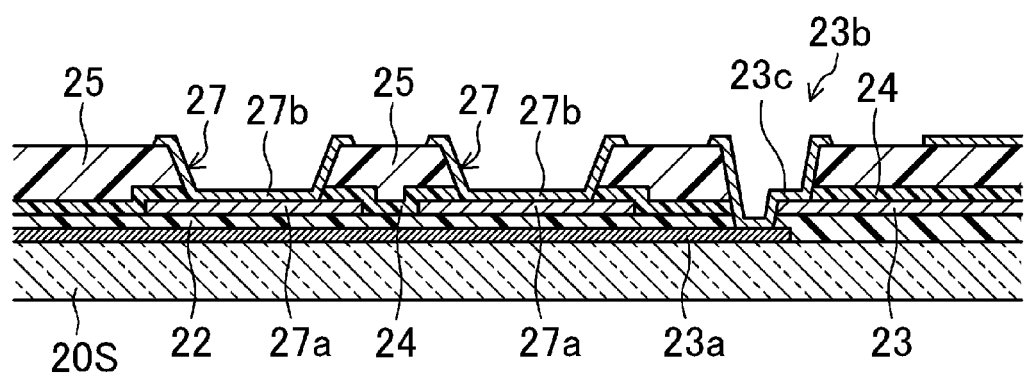
FIG. 10 is a cross-sectional view taken along line X-X of FIG. 6.

As shown in FIG. 7, an end portion of each of the gate lines 21 is extended to the non-display region N to be connected to a gate driver (not shown) mounted in the terminal region T. On the other hand, the source lines 23 are each connected to a corresponding one of a large number of source lead lines 23a in the non-display region N. The source lead line 23a is formed of the first metal and is provided in the same layer in which the gate line 21 is provided, and is connected to a source driver (not shown) in the terminal region T. As shown in FIG. 10, the source line 23 and the source lead line 23a are electrically connected together via a conductive film 23c which is formed of the third metal provided on a surface of a contact hole in a source line contact portion 23b.

As described above, in the array substrate 20, the continuous annular groove 27 is provided around the display region D in the same layer in which the passivation film 24 and the planarization film 25 are provided, above the first metal in the substrate outer perimeter portion. The groove 27 is formed by providing a hollow portion by developing the planarization film 25 made of photosensitive acrylic resin and performing etching using the developed planarization film 25 as a mask. The groove 27 extends across above the gate line 21 and the source lead line 23a provided in the same layer in which the gate line 21 is provided. Because the annular continuous groove 27 extends across above the first metal, such as the gate line 21, the source lead line 23a, etc., the material for the alignment film 26 can be reduced or prevented from flowing toward the outside of the substrate during formation of the alignment film 26. Therefore, the distance between the alignment film 26 and the sealing member 40 can be reduced, resulting in a narrower picture-frame.

As shown in FIGS. 7-10, an underlying metal 27a is provided below the groove 27. The underlying metal 27a functions as an etch stopper during formation of the groove 27. The underlying metal 27a has a continuous annular shape corresponding to the shape of the groove 27. The underlying metal 27a has a larger width (e.g., about 60 μm) than that of the groove 27. The underlying metal 27a is formed of the second metal. Because the underlying metal 27a is provided below the groove 27, the first metal (the gate line 21, the source lead line 23a, etc.) is not exposed from the surface by etching during formation of the groove 27. Therefore, it is not likely that a short circuit is made between the first metals via a conductive object present on the surface of the groove 27, or that the first metal is exposed from the surface of the groove 27 and is corroded. Even if conduction is established to the underlying metal 27a via a conductive object present on the surface of the groove 27, the underlying metal 27a is not an interconnect which is directly involved in driving of the display device, and therefore, an image defect is not likely to occur. Note that the underlying metal 27a is formed of the second metal and is provided in the same layer in which and the source line 23 is formed, and therefore, can be formed simultaneously with the source line 23.

The surface of the groove 27 is covered by a transparent conductive film 27b. The transparent conductive film 27b is formed of the third metal, such as an ITO film, etc. Because the surface of the groove 27 is covered by the transparent conductive film 27b, the underlying metal 27a is not exposed from the surface of the groove 27, and therefore, corrosion of the underlying metal 27a is not likely to occur, for example.

In the array substrate 20, a transfer pad 28 is further provided in the non-display region N. A plurality of the transfer pads 28 are provided around the display region D. The transfer pad 28 is electrically connected to the common electrode 31 provided on the entire surface of the counter substrate 30 via a transfer member interposed between the array substrate 20 and the counter substrate 30. Therefore, if the transfer pad 28 is maintained at a common potential, the common potential can be applied to the common electrode 31.

The transfer member may be, for example, conductive beads (not shown) contained in the sealing member 40. The conductive bead may be, for example, a plastic with gold plating on a surface thereof.

The transfer pads 28 are connected to a transfer bus line (not shown) which is provided along an outer perimeter of a region in which the transfer pads 28 are provided. The transfer bus line is connected to an external connection terminal. When the common potential is applied to the external connection terminal, the common potential is directly transferred to each transfer pad 28, and then via the transfer member to the common electrode 31 of the counter substrate 30.

Figure 9:
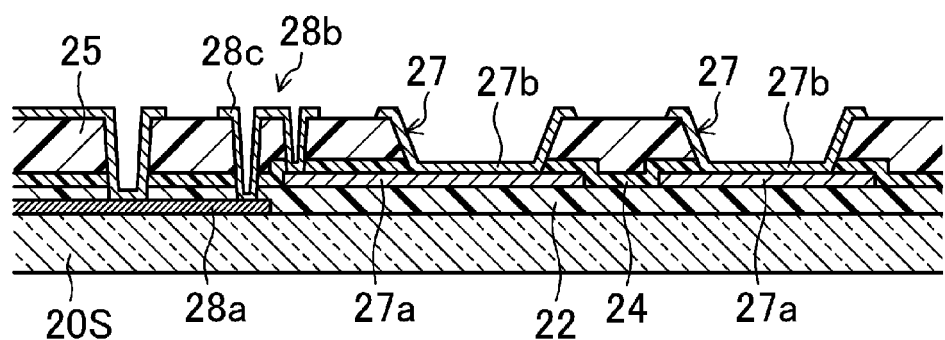
FIG. 9 is a cross-sectional view taken along line IX-IX of FIG. 6.

The transfer pad 28 is electrically connected to the underlying metal 27a via a transfer pad lead line 28a. Here, the outer one of the two underlying metals 27a is connected to the transfer pad 28. As shown in FIG. 9, the transfer pad lead line 28a and the underlying metal 27a are electrically connected to each other in a transfer pad contact portion 28b via a conductive film 28c formed of the third metal provided on the contact hole surface. Because the transfer pad 28 and the underlying metal 27a are electrically connected to each other, the potential of the underlying metal 27a can be maintained at the same common potential as that of the transfer pad 28. Therefore, even if conduction is established between the common electrode 31 and the underlying metal 27a via the transfer member contained in the sealing member 40, an image defect is not likely to occur due to that conduction. Note that one, some, or all of the transfer pads 28 may be connected via the transfer pad lead line 28a to the underlying metal 27a.

Note that the inner one of the two underlying metals 27a is not connected to the transfer pad 28, and therefore, is not electrically connected to other interconnects, i.e., is in the floating state. Therefore, even if conduction is established between the common electrode 31 and the underlying metal 27a via the transfer member contained in the sealing member 40, an image defect is not likely to occur due to that conduction.

<Method for Manufacturing Liquid Crystal Display Device 10>

Figure 11:
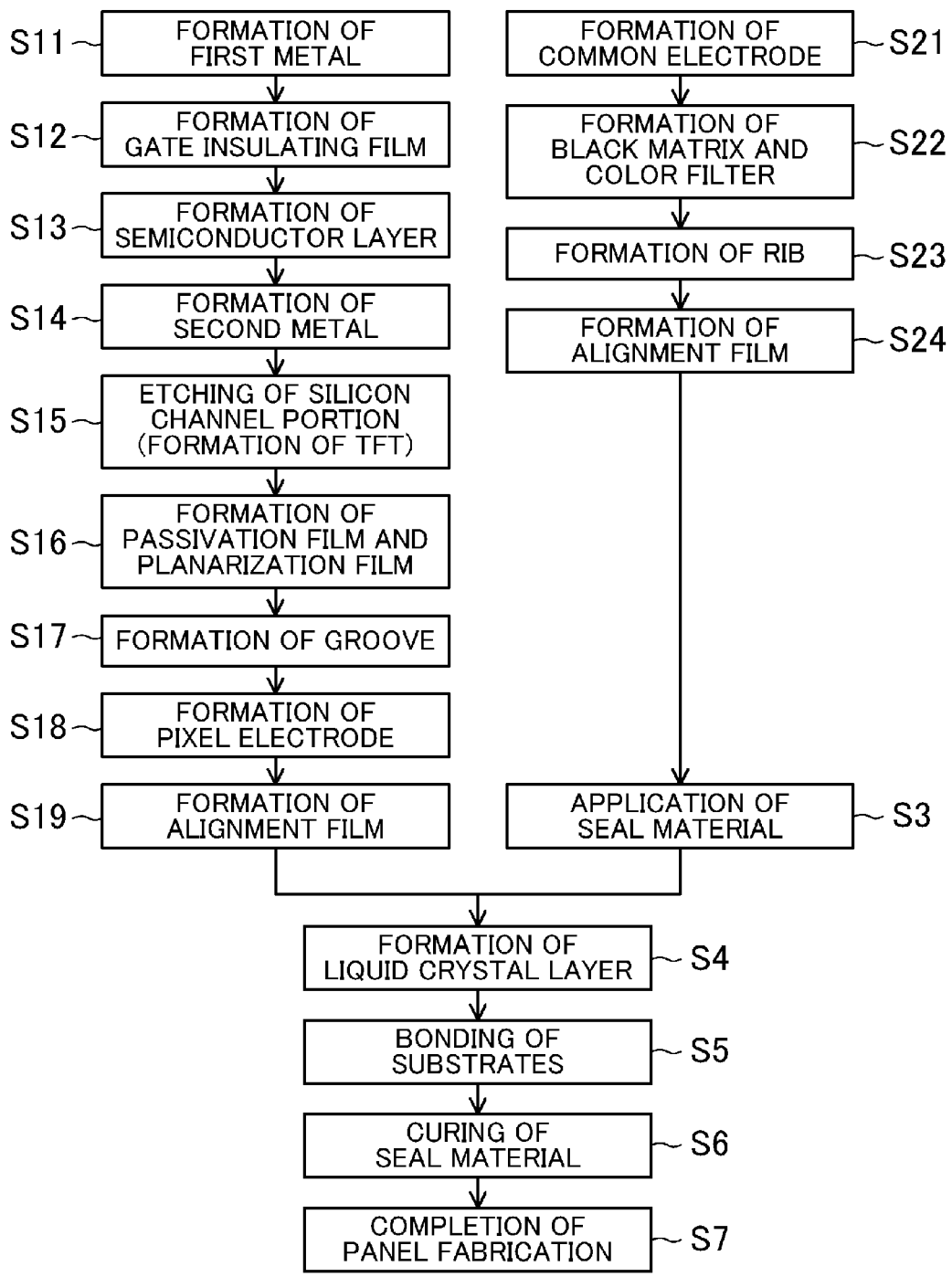
FIG. 11 is a flowchart showing a method for manufacturing a liquid crystal display device.

Next, a method for manufacturing the liquid crystal display device 10 of this embodiment will be described with reference to a flowchart shown in FIG. 11. The manufacturing method of this embodiment includes an array substrate fabrication process corresponding to steps S11-S19 of FIG. 11, a counter substrate fabrication process corresponding to steps S21-S24 of FIG. 11, and a liquid crystal display panel fabrication process corresponding to steps S3-S7 of FIG. 11.

(Array Substrate Fabrication Process)

Initially, in step S11, the first metal is provided on the substrate body 20S using a known technique to simultaneously form the gate line 21, the source lead line 23a, the transfer pad lead line 28a, etc. Thereafter, in steps S12 and S13, the gate insulating film 22 and a semiconductor layer are formed using a known technique.

Next, in step S14, the second metal is provided on the gate insulating film 22 and the semiconductor layer using a known technique to simultaneously form the source line 23, the underlying metal 27a, etc. Thereafter, in step S15, a channel portion is formed in the semiconductor layer by patterning to form a TFT.

Next, in step S16, the passivation film 24 and the planarization film 25 are successively formed using a known technique, and thereafter, in step S17, the planarization film 25 made of photosensitive acrylic resin is developed, and etching is performed using the developed planarization film 25 as a mask to form the groove 27. In this case, the underlying metal 27a functions as an etch stopper, and therefore, the underlying metal 27a is exposed from the surface of the groove 27. Thereafter, in step S18, the third metal is provided on the planarization film 25 using a known technique to form the pixel electrode, the transparent conductive film 27b covering the surface of the groove 27, etc.

Finally, in step S19, the alignment film 26 is formed using a known technique to complete fabrication of the array substrate 20.

(Counter Substrate Fabrication Process)

Initially, in step S21, the transparent conductive film 27b is formed to cover the entire substrate using a known technique, thereby forming the common electrode 31. Thereafter, in step S22, the black matrix and the color filter are formed on the substrate body 30S using a known technique. In this case, simultaneously, a lower layer portion 33a of the rib 33 is formed of the black matrix or the color filter in a region in which the rib 33 is to be provided, i.e., a region along the outer perimeter portion of the counter substrate 30.

Next, in step S23, an organic resin film 33b is formed using a known technique in a region along the outer perimeter portion of the counter substrate 30 in which the rib 33 is to be formed, thereby forming the rib 33. In this case, simultaneously, another rib 33 having a predetermined layout may be formed in the display region D to serve as a liquid crystal alignment limiting rib.

Finally, in step S24, the alignment film 32 is formed using a known technique to complete fabrication of the counter substrate 30.

(Liquid Crystal Display Panel Fabrication Process)

Initially, in step S3, a material for the sealing member is applied to the counter substrate 30 around the display region D using a known technique. Next, in step S4, a liquid crystal material is dropped to a region surrounded by the sealing member material to form the liquid crystal layer 50.

Next, in step S5, the array substrate 20 is put on top of the counter substrate 30 so that the sealing member material is interposed therebetween. In this case, the groove 27 of the array substrate 20 and the rib 33 of the counter substrate 30 are stacked to fit together in the non-display region N.

Finally, in step S6, the sealing member material is cured by UV irradiation and/or heating. In this case, the array substrate 20 and the counter substrate 30 are bonded together to complete fabrication of the liquid crystal display panel (step S7). A polarizing plate is attached to the liquid crystal display panel, parts are mounted, and modulization processes (mounting of the backlight, etc.) are performed, to complete fabrication of the liquid crystal display device 10.

Variations of First Embodiment

Variations of the first embodiment will be described hereinafter.

(First to Third Variations)

In the first embodiment, the two grooves 27 are provided, only the underlying metal 27a corresponding to the outermost groove 27 is connected to the transfer pad 28, and the underlying metal 27a below the inner groove 27 is not electrically connected to other interconnects, i.e., is in the floating state. Alternatively, if a plurality of grooves 27 are provided, the underlying metals 27a corresponding to all of the grooves 27 may be connected to the transfer pad 28. Conversely, all of the underlying metals 27a may be in the floating state.

Figure 12:
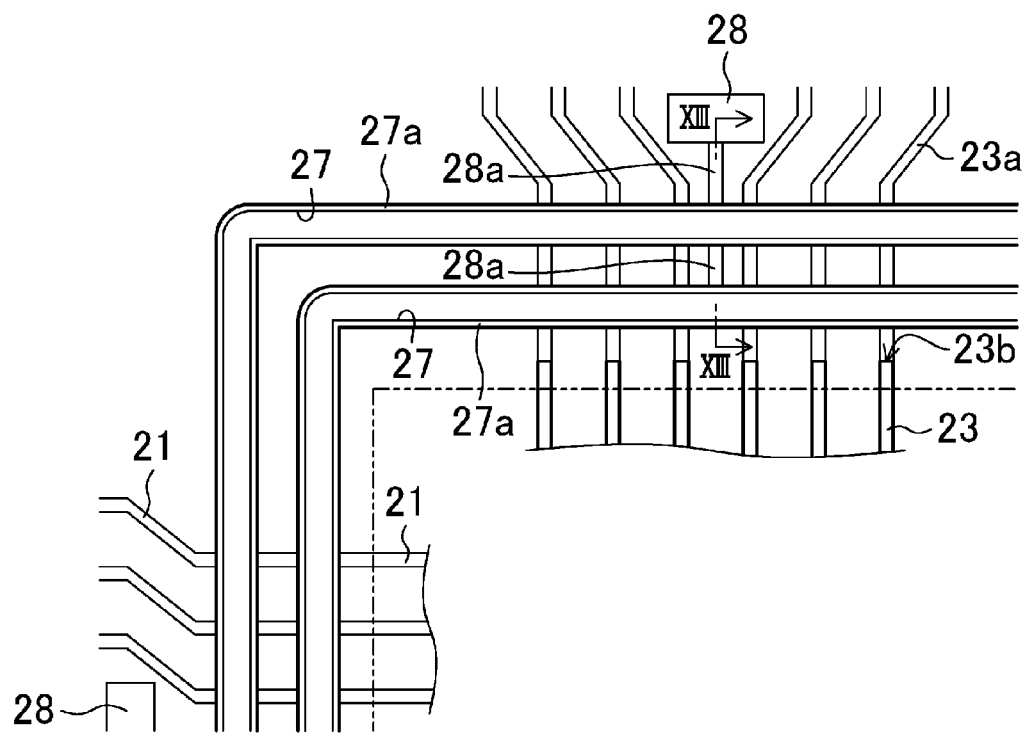
FIG. 12 is an enlarged plan view of a main portion of an array substrate according to a first variation of the first embodiment, corresponding to the region AR1 of FIG. 4.
Figure 13:
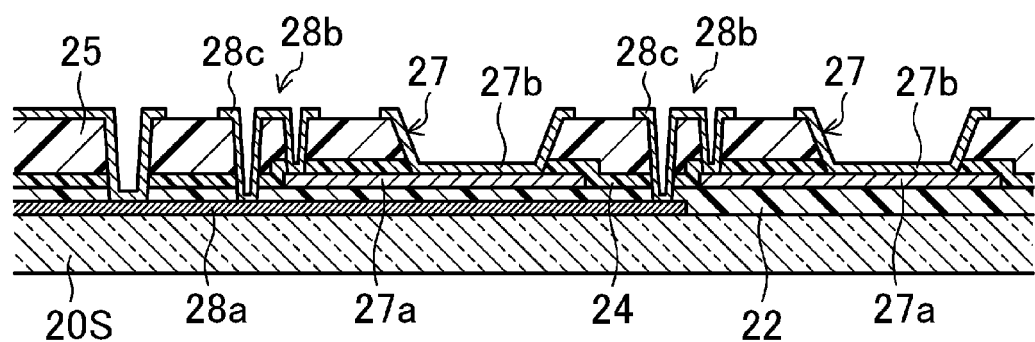
FIG. 13 is a cross-sectional view taken along line XIII-XIII of FIG. 12.
Figure 14:
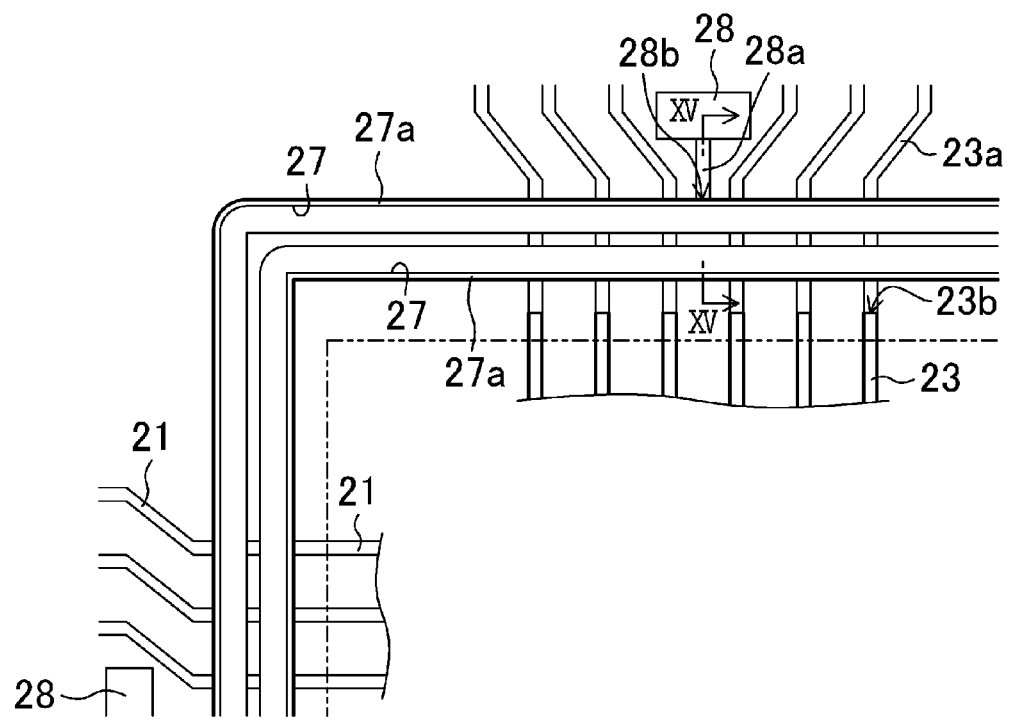
FIG. 14 is an enlarged plan view of a main portion of an array substrate according to a second variation of the first embodiment, corresponding to the region AR1 of FIG. 4.
Figure 15:
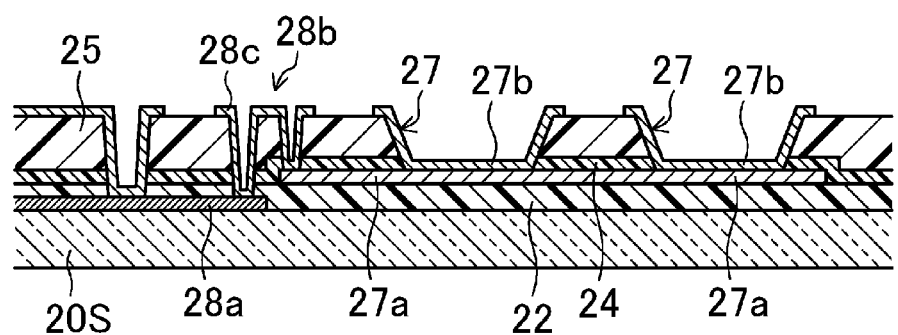
FIG. 15 is a cross-sectional view taken along line XV-XV of FIG. 14.

For example, as shown in FIGS. 12 and 13 (first variation), the transfer pad lead line 28a may be formed to extend to an area in the vicinity of a layer below the inner groove 27, whereby the transfer pad lead line 28a may be electrically connected via the transfer pad contact portion 28b to the underlying metal 27a below the inner groove 27 as well as the underlying metal 27a below the outer groove 27. As in the first embodiment, one underlying metal 27a is provided for each groove 27. Alternatively, for example, as shown in FIGS. 14 and 15 (second variation), the underlying metal 27a may be integrally provided for a plurality of grooves 27. Also in this case, the common potential is applied to the underlying metal 27a below all of the grooves 27.

Figure 16:
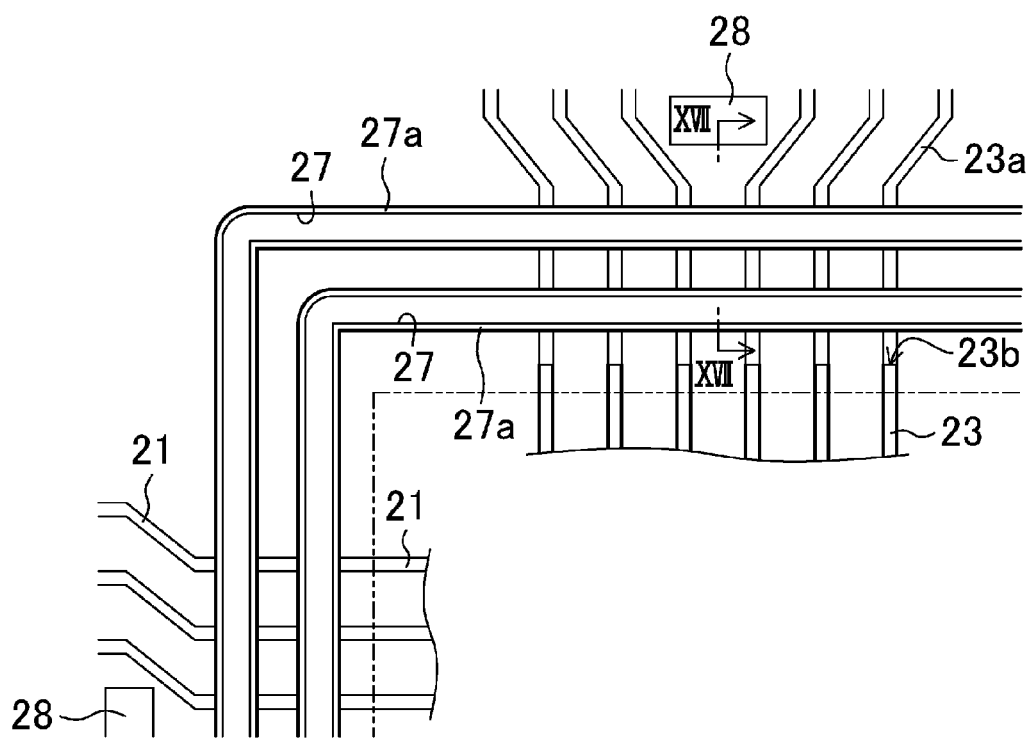
FIG. 16 is an enlarged plan view of a main portion of an array substrate according to a third variation of the first embodiment, corresponding to the region AR1 of FIG. 4.
Figure 17:
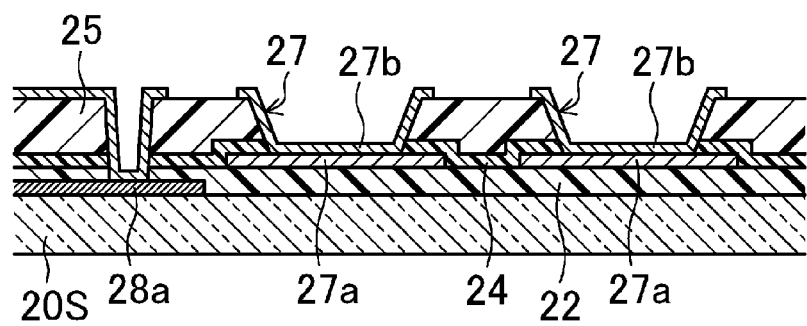
FIG. 17 is a cross-sectional view taken along line XVII-XVII of FIG. 16.

For example, as shown in FIGS. 16 and 17 (third variation), the transfer pad lead line 28a may not be provided in the transfer pad 28, and the underlying metal 27a may not be connected to the transfer pad 28. In this case, none of the underlying metals 27a is electrically connected to other interconnects, i.e., all of the underlying metals 27a are in the floating state. Therefore, even if conduction is established between the common electrode 31 and the underlying metal 27a via the transfer member contained in the sealing member 40, it is not likely that an image defect occurs due to that conduction.

(Fourth Variation)

Figure 18:
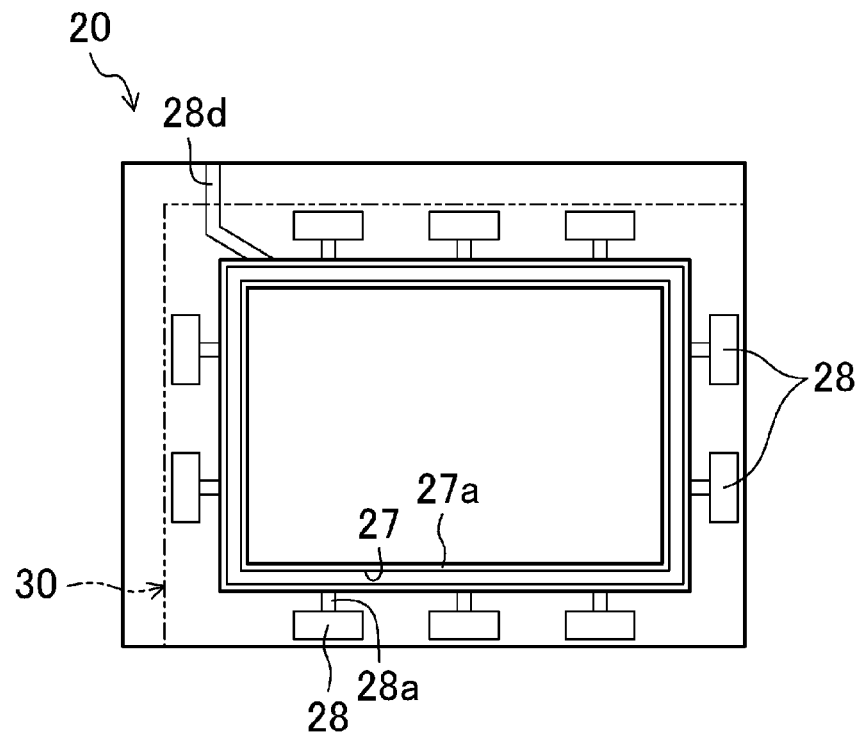
FIG. 18 is an enlarged plan view of a main portion of an array substrate according to a fourth variation of the first embodiment.

In the first embodiment, the transfer pads 28 receive the common potential from the transfer bus line (not shown) provided along the outer perimeter of the region in which the transfer pads 28 are provided. Alternatively, as shown in FIG. 18 (fourth variation), the transfer bus line may not be provided along the outer perimeter of the region in which the transfer pads 28 are provided, and the underlying metal 27a may also serve as the transfer bus line. In this case, the underlying metal 27a is connected to an external connection terminal (not shown) via a common potential input line 28d, and is electrically connected to the transfer pads 28 via the respective transfer pad lead lines 28a. The common potential applied from the external connection terminal is transferred via the underlying metal 27a to the transfer pad 28. Because the underlying metal 27a serves as the transfer bus line, it is not necessary to provide a separate transfer bus line along the outer perimeter of the region in which the transfer pads 28 are provided, and therefore, the picture-frame can be narrowed.

(Fifth Variation)

Figure 19:
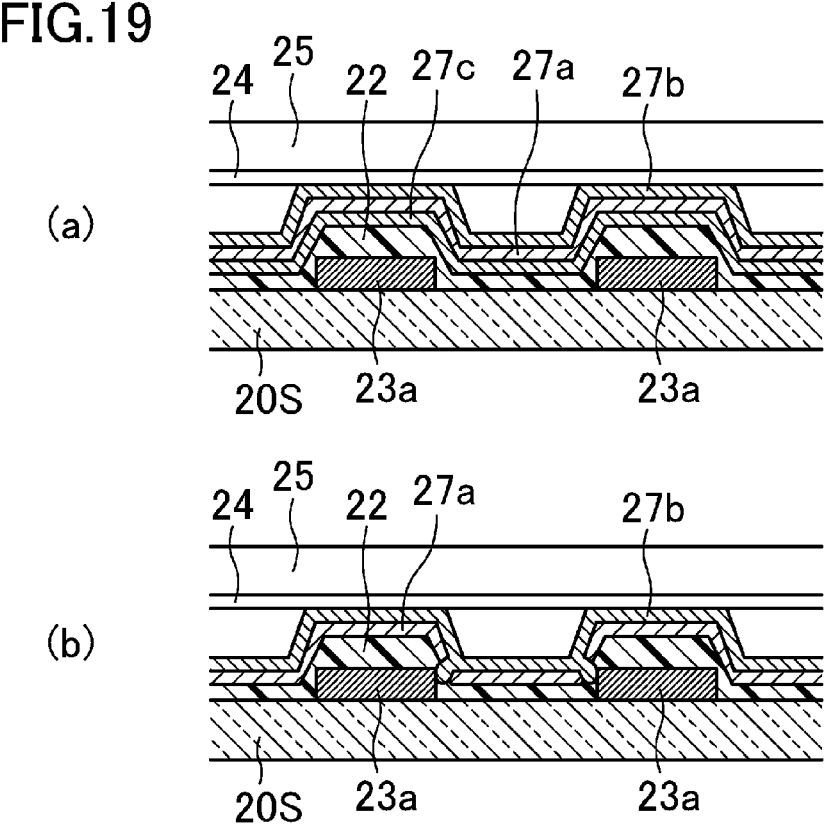
FIG. 19(a) is a cross-sectional view of an array substrate according to a fifth variation of the first embodiment.
FIG. 19(b) is a cross-sectional view of the array substrate of the first embodiment for the purpose of comparison with that variation.

As shown in FIG. 19(*a*) (fifth variation), in addition to the configuration of the first embodiment, a silicon film 27c may be formed between the gate insulating film 22 and the underlying metal 27a. The silicon film 27c is formed of the same material for the semiconductor layer of the TFT provided in the display region D.

The gate insulating film 22 and the underlying metal 27a are raised in the region in which the first metal is provided. Therefore, as shown in FIG. 19(*b*), the underlying metal 27a in a wall region of the raised portion may have a smaller thickness under some film formation conditions. Therefore, for example, in the step of providing the contact hole in the gate insulating film 22 and the passivation film 24 by dry etching, it is likely that a hole occurs in a thinner portion of the gate insulating film 22 or the underlying metal 27a, so that conduction is established between the transparent conductive film 27b provided on the underlying metal 27a and the gate line 21, and therefore, a short circuit is made between the gate lines 21 via the transparent conductive film 27b.

However, the silicon film 27c is provided below the underlying metal 27a, and therefore, even if the underlying metal 27a becomes thinner in the wall region of the raised portion, the silicon film 27c functions as an etch stopper during dry etching, whereby a short circuit can be reduced or prevented from being made between the first metals via the conductive film.

The silicon film 27c may be formed only by changing the layout of the silicon film during formation of the TFT semiconductor layer. Therefore, an additional step is not required to provide the silicon film 27c below the underlying metal 27a.

(Sixth Variation)

Figure 20:
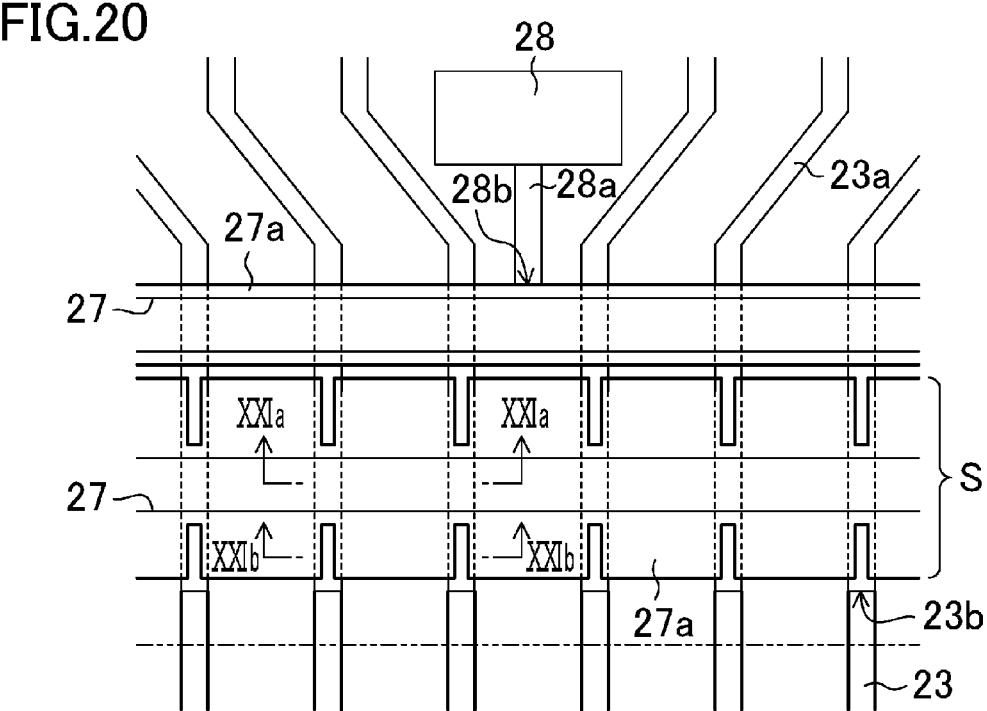
FIG. 20 is an enlarged plan view of a main portion of an array substrate according to a sixth variation of the first embodiment, corresponding to a region AR2 of FIG. 4.
Figure 21:
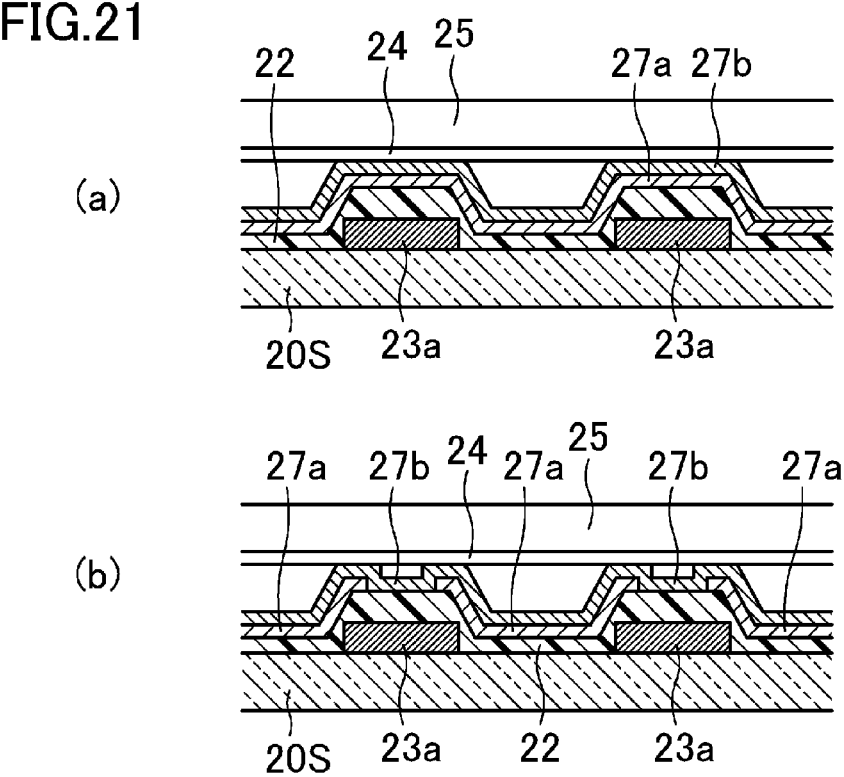
FIG. 21(a) is a cross-sectional view taken along line XXIa-XXIa of FIG. 20.
FIG. 21(b) is a cross-sectional view taken along line XXIb-XXIb of FIG. 20.

In the first embodiment, the light blocked region is formed in the picture-frame region of the counter substrate 30 using the black matrix. Alternatively, a light blocked region S may be provided in the picture-frame region of the array substrate 20 by providing a light blocking layer in that region, instead of the counter substrate 30. In this case, as shown in FIGS. 20 and 21 (sixth variation), the underlying metal 27a may also serve as a light blocking layer.

(Seventh Variation)

In the first embodiment, the surface of the groove 27 is covered by the transparent conductive film 27b. Alternatively, for example, as shown in FIG. 22 (seventh variation), the surface of the groove 27 may not be covered by the transparent conductive film 27b, and the underlying metal 27a may be exposed.

Figure 22:
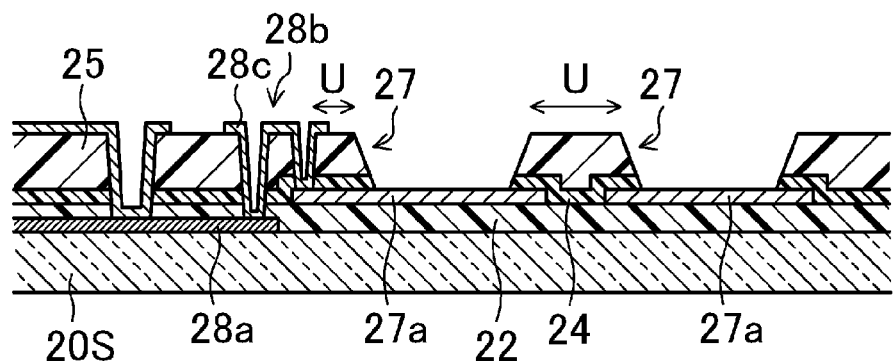
FIG. 22 is an enlarged plan view of a main portion of an array substrate according to a seventh variation of the first embodiment, corresponding to the cross-sectional view taken along line IX-IX of FIG. 6.

Because the transparent conductive film 27b is not provided on the surface of the groove 27, the picture-frame region of the display device can be narrowed by an amount corresponding to a width of a region in which the transparent conductive film 27b would otherwise be provided (see a distance U in FIG. 22). Also, because the underlying metal 27a is exposed, the underlying metal 27a is more easily corroded than when the surface of the groove 27 is covered by the transparent conductive film 27b. However, the underlying metal 27a is not an interconnect which is not directly involved in driving of the display device, and therefore, the display performance is not likely to decrease. Note that, in this case, the anti-corrosion capability of the second metal (the underlying metal 27a) can be enhanced by adjusting a temperature control or process conditions during formation of the second metal.

(Eighth Variation)

In the first embodiment, the first and second metals are formed of a Ti film and a Cu film put on top of the Ti film. The present invention is not particularly limited to this. For example, the first metal may be formed of a Ti film (thickness: about 50 nm), an Al film (thickness: about 300 nm), and a Ti film (thickness: about 100 nm) which are sequentially formed and stacked together from bottom to top, and the second metal may be formed of a Ti film (thickness: about 50 nm) and an Al film (thickness: about 300 nm) put on top of the Ti film. Alternatively, the first metal may be formed of a Mo film (thickness: about 50 nm) and an Al film (thickness: about 300 nm) put on top of the Mo film, and the second metal may be formed of a Mo film (thickness: about 50 nm), an Al film (thickness: about 300 nm), and a Mo film (thickness: about 50 nm) which are sequentially formed and stacked together from bottom to top.

Figure 23:
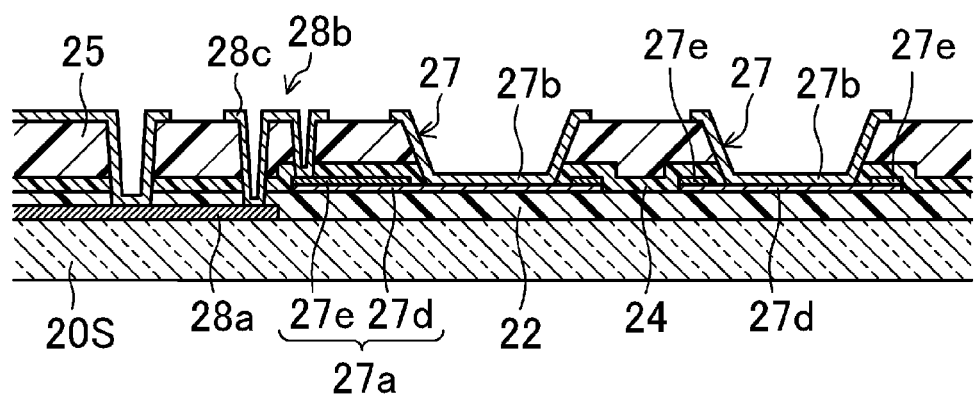
FIG. 23 is an enlarged plan view of a main portion of an array substrate according to an eighth variation of the first embodiment, corresponding to the cross-sectional view taken along line IX-IX of FIG. 6.

When the second metal is formed of a multilayer structure of a Ti film and an Al film, and an ITO film is provided as the transparent conductive film 27b on the surface of the groove 27, as shown in FIG. 23 (eighth variation) it is preferable that the underlying metal 27a should be formed of a single Ti film 27d (i.e., the underlying metal 27a is a single-layer film), and the transparent conductive film 27b should not make contact with an Al film 27e in a region in which the underlying metal 27a and an ITO film 27b make contact with each other. This is because the Al film and the ITO film have a large difference in ionization tendency, and therefore, if the Al film 27e and the ITO film 27b make contact with each other, the Al film 27e is likely to electrochemically corrode.

In the first embodiment, the annular rib 33 is formed around the display region D in the counter substrate 30. Alternatively, the liquid crystal display device 10 may include the counter substrate 30 in which the rib 33 is not provided. Note that the rib 33 is preferably provided in the counter substrate 30 in order to narrow the picture-frame by reducing or preventing the material for the alignment film 32 of the counter substrate 30 from flowing into the seal region SL.

Second Embodiment

Next, a liquid crystal display device 10 according to a second embodiment will be described. Note that parts which are the same as or corresponding to those of the first embodiment are indicated by the same reference characters as those of the first embodiment.

The liquid crystal display device 10 includes an array substrate 20 and a counter substrate 30 which face each other and are bonded together by a sealing member 40 provided in an outer perimeter portion thereof, and a liquid crystal layer 50 as a display layer in a space enclosed by the sealing member 40. The liquid crystal display device 10 has the same configuration as that of the first embodiment, except for the array substrate 20.

As in the first embodiment, the array substrate 20 includes a first metal including gate lines 21, a gate insulating film 22, a second metal including source lines 23, a passivation film 24, a planarization film 25, a third metal including pixel electrodes, and an alignment film 26, which are formed and stacked together on a substrate body 20S. The array substrate 20 also includes a continuous annular groove 27 provided around a display region D.

Figure 24:
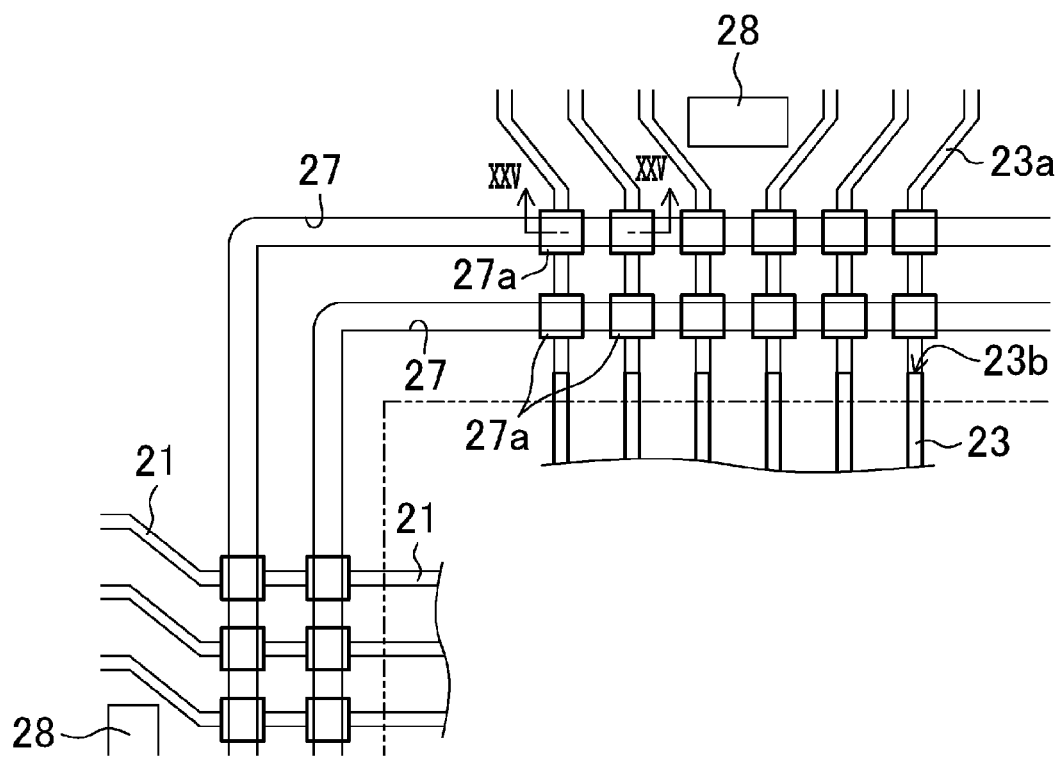
FIG. 24 is an enlarged plan view of a main portion of an array substrate according to a second embodiment, corresponding to the region AR1 of FIG. 4.
Figure 25:
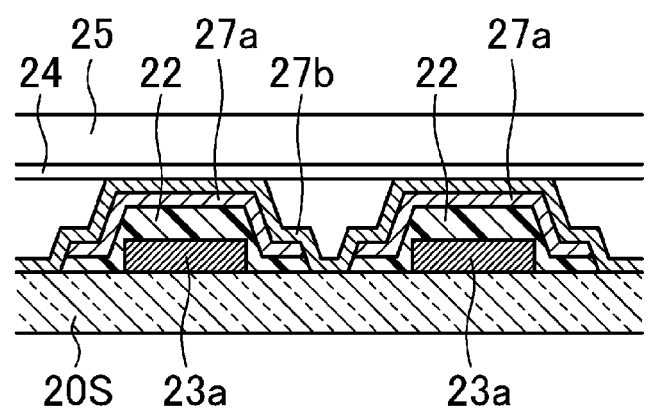
FIG. 25 is a cross-sectional view taken along line XXV-XXV of FIG. 24.

An underlying metal 27a is provided below the groove 27. In the second embodiment, as shown in FIGS. 24 and 25, a plurality of underlying metals 27a which are spaced apart from each other in an island pattern are provided in regions in which source lead lines 23a and the groove 27 overlap each other as viewed from above.

Because the underlying metals 27a are spaced apart from each other in an island pattern, even if conduction is established between one underlying metal 27a and the source lead line 23a or the gate line 21 below that underlying metal 27a to cause a defect, the defect does not affect other underlying metals 27a, resulting in an increase in yield.

Also, because the underlying metals 27a are spaced apart from each other in an island pattern, the groove 27 has a depth which is larger by an amount corresponding to the underlying metal 27a, in a region in which the underlying metal 27a is not provided below the groove 27. Therefore, the material for the alignment film 26 can be effectively reduced or prevented from flowing toward the outside of the substrate.

When the underlying metals 27a are spaced apart from each other in an island pattern, none of the underlying metals 27a are electrically connected to other interconnects, i.e., the underlying metals 27a are in the floating state, and therefore, even if conduction is established between the common electrode 31 and the underlying metal 27a, for example, via a transfer member contained in the sealing member 40, an image defect is not likely to occur due to that conduction.

Figure 26:
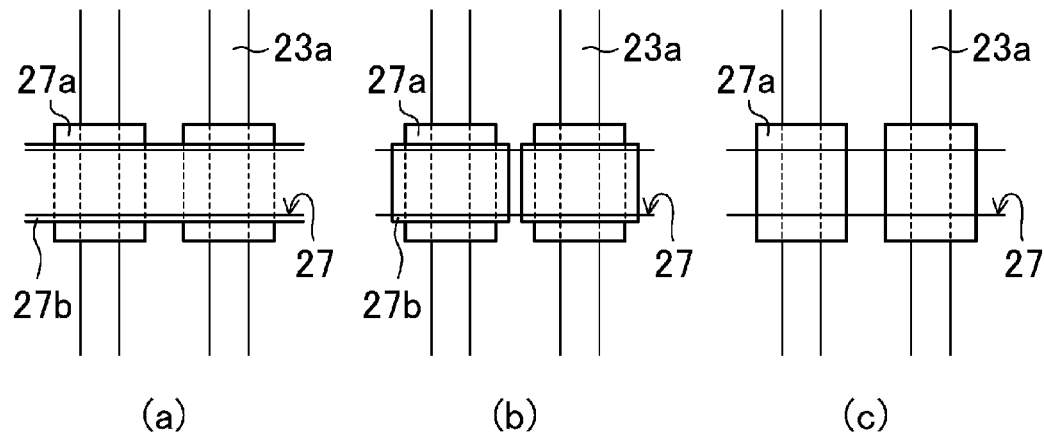
FIGS. 26(a)-26(c) are enlarged diagrams of a main portion of FIG. 24.

Note that the surface of the groove 27 may be covered by a transparent conductive film 27b which is a third metal, such as an ITO film, etc. In this case, as shown in FIG. 26(a), the transparent conductive film 27b may cover the entire surface of the groove 27, or alternatively, as shown in FIG. 26(b), the transparent conductive film 27b may cover a region of the surface of the groove 27 in which the underlying metal 27a is formed. Alternatively, as shown in FIG. 26(c), the surface of the groove 27 may not be covered by the transparent conductive film 27b.

The other configurations and advantages are the same as those described in the first embodiment. The examples described in the variations of the first embodiment can be applied to the second embodiment.

Third Embodiment

Next, a liquid crystal display device 10 according to a third embodiment will be described.

Figure 27:
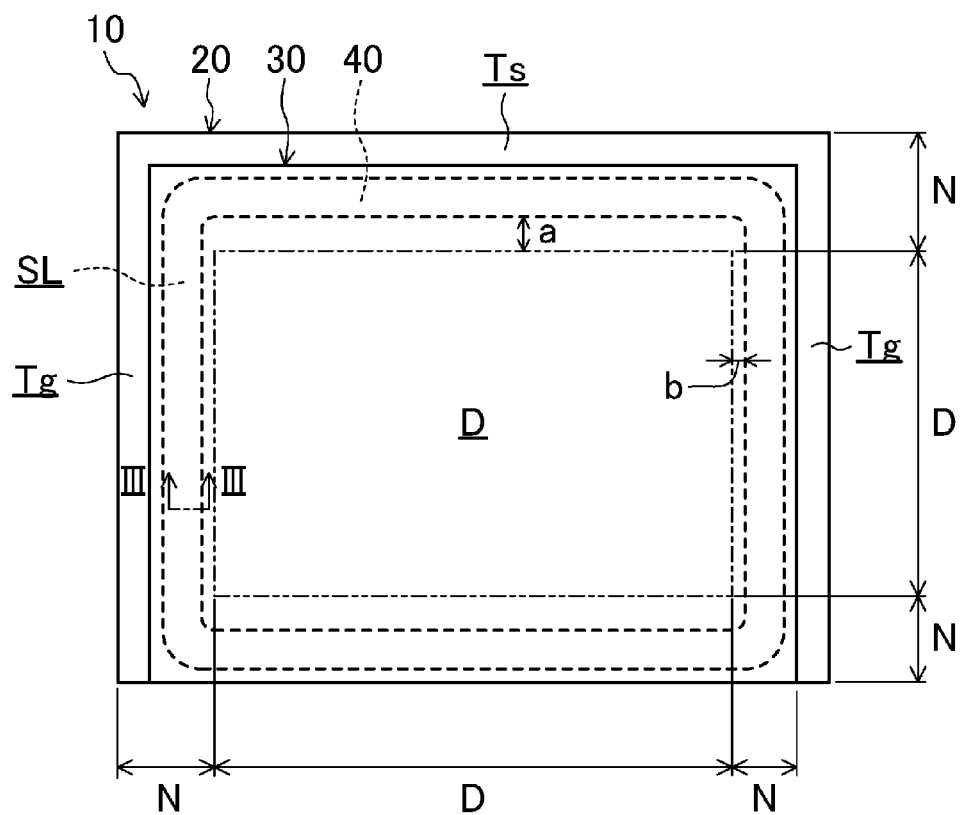
FIG. 27 is a plan view of a liquid crystal display device according to a third embodiment.
Figure 28:
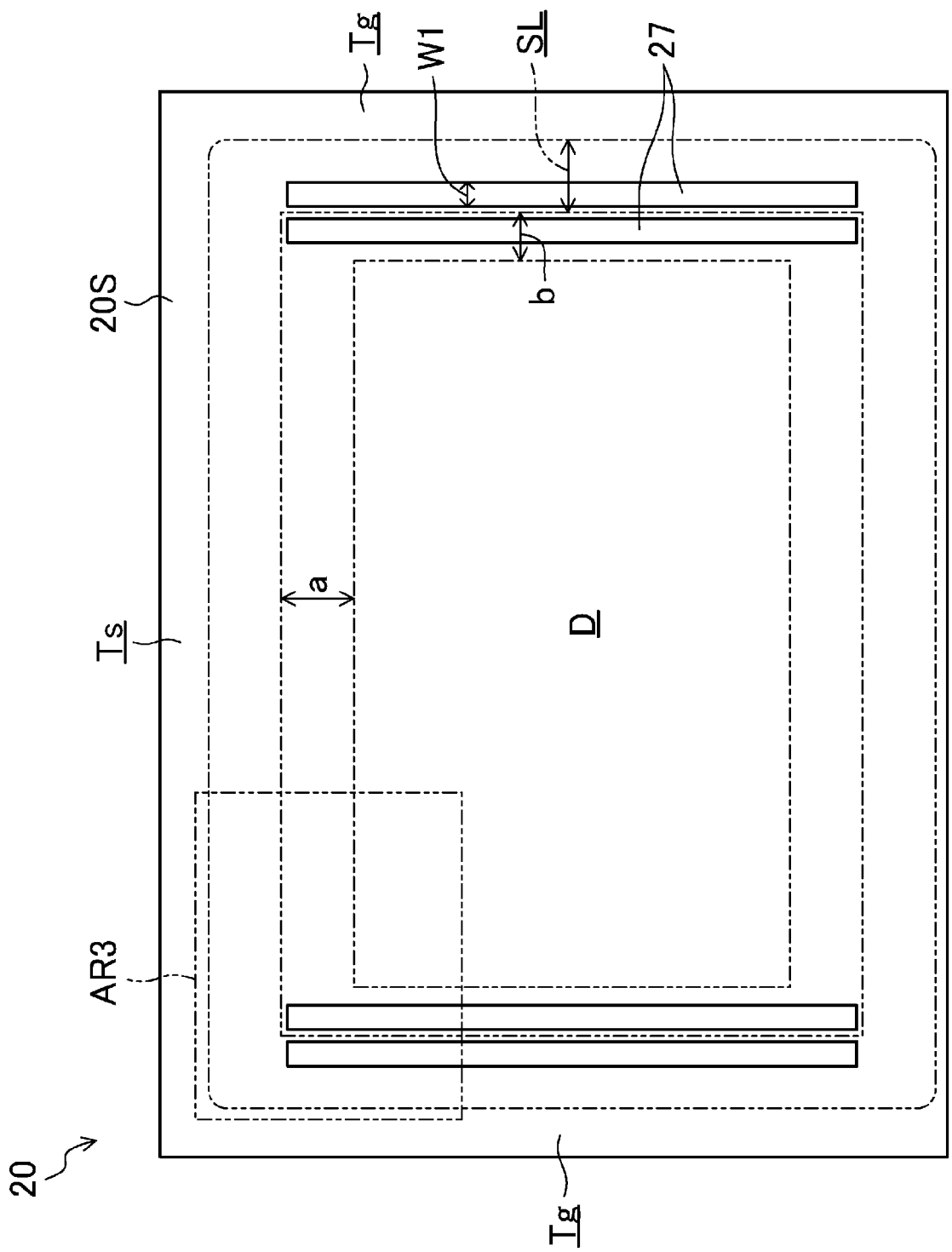
FIG. 28 is a plan view of an array substrate.
Figure 29:
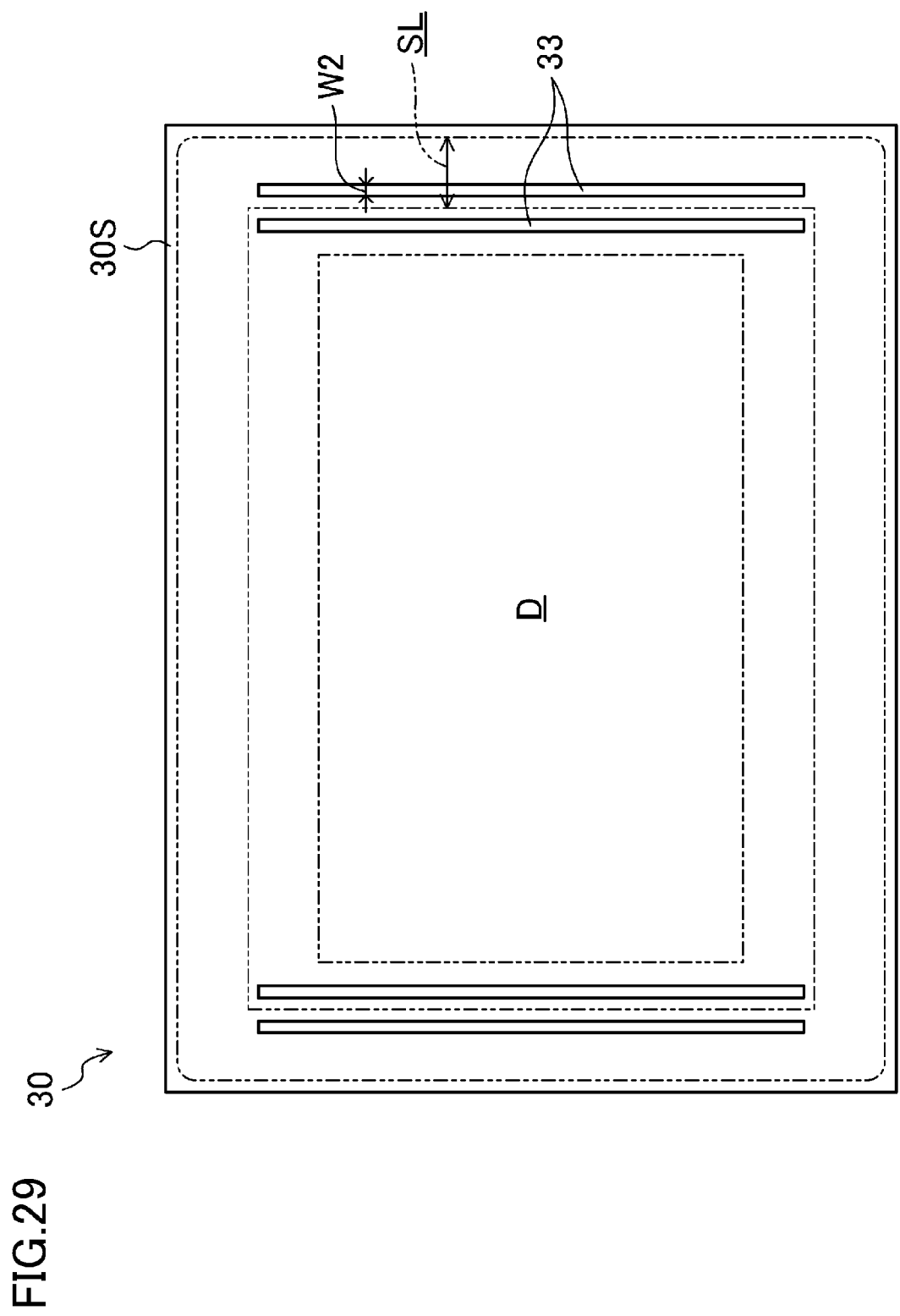
FIG. 29 is a plan view of a counter substrate.

FIG. 27 is a diagram schematically showing the entire liquid crystal display device 10 of the third embodiment. The enlarged cross-sectional view of an area in the vicinity of a seal region SL of the liquid crystal display device 10 is similar to that of the first embodiment shown in FIG. 3. FIGS. 28 and 29 are plan views of an array substrate 20 and a counter substrate 30, respectively. Note that parts which are the same as or corresponding to those of the first embodiment are indicated by the same reference characters as those of the first embodiment.

The liquid crystal display device 10 includes the array substrate 20 and the counter substrate 30, which face each other and are bonded together by a sealing member 40 provided in an outer perimeter portion (seal region SL) thereof, and a liquid crystal layer 50 as a display layer in a space enclosed by the sealing member 40. A region in which the liquid crystal layer 50 is provided is a display region D, and a frame-shaped non-display region N is provided around the display region D. The non-display region N has a source terminal region Ts in a portion of one longer side of the liquid crystal display device 10 and gate terminal regions Tg in portions of two shorter sides of the liquid crystal display device 10. The seal region SL is arranged so that a distance between (a length "a" in FIG. 27) between the display region D and the seal region SL at the longer side of the liquid crystal display device 10 is longer than a distance (a length "b" in FIG. 27) between the display region D and the seal region SL at the shorter side of the liquid crystal display device 10.

As in the first embodiment, the array substrate 20 includes a first metal including gate lines 21, a gate insulating film 22, a second metal including source lines 23, a passivation film 24, a planarization film 25, a third metal including pixel electrodes, and an alignment film 26, which are formed and stacked together on a substrate body 20S. The array substrate 20 also includes a groove 27 provided in the same layer in which the passivation film 24 and the planarization film 25 are provided. The groove 27 extends along each of the gate terminal regions Tg in a narrow picture-frame of the non-display region N. The groove 27 reduces or prevents a liquid crystal resin material for the alignment film 26 from flowing from the display region D toward the gate terminal region Tg during formation of the alignment film 26. One or a plurality of the grooves 27 may be provided (two grooves in FIG. 28).

The counter substrate 30 includes a common electrode 31, a color filter and a black matrix, and an alignment film 32, which are formed and stacked together on a substrate body 30S. A region in which light is blocked by the black matrix is provided in the non-display region N. In the counter substrate 30, the rib 33 is formed. The rib 33 extends along each of the gate terminal regions Tg in a narrow picture-frame of the non-display region N. The rib 33 reduces or prevents a resin material for the alignment film 32 from flowing from the display region D toward the gate terminal region Tg during formation of the alignment film 32. One or a plurality of the ribs 33 may be provided (two ribs in FIG. 29).

The rib 33 is positioned in a region corresponding to the groove 27 provided on the array substrate 20 so that the groove 27 and the rib 33 can fit and stack together. The groove 27 and the rib 33 are provided in the two substrates so that a liquid resin material for the alignment films 26 and 32 is reduced or prevented from flowing from the display region D toward the gate terminal region Tg. As a result, the distance ("b" in FIG. 27) between the alignment films 26 and 32 in a portion along the gate terminal region Tg and the sealing member 40 can be reduced, resulting in a narrower picture-frame. The stacking arrangement of the array substrate 20 and the counter substrate 30 in a portion in which the groove 27 and the rib 33 are provided has the same cross-sectional view as that of the first embodiment of FIG. 3.

As in the first embodiment, the groove 27 has a width of about 50 μm (W1 of FIG. 3) and a depth of about 2.5 μm (H1 of FIG. 3). The rib 33 has a width of about 30 μm (W2 of FIG. 3) and a protrusion height of about 2.0 μm from the substrate surface (H2 of FIG. 3). The sealing member 40 contains a pulverized glass fiber material 41 (fiber diameter: about 4.0 μm, for example) whose fiber diameter is set to a distance between the array substrate 20 and the counter substrate 30, as a spacer for providing a uniform distance between the two substrates. When the rib 33 is provided in the non-display region N of the counter substrate 30, then if the pulverized glass fiber material 41 is present in a region in which the rib 33 is provided, the distance between the two substrates is the sum of the fiber diameter of the pulverized glass fiber material 41 and the height of the rib 33, and therefore, it is likely to be difficult to control the cell thickness. However, the groove 27 and the rib 33 are positioned so that the groove 27 and the rib 33 fit together, and the protrusion height (H2) from the substrate surface of the rib 33 is set to be smaller than or equal to the depth (H1) of the groove 27, and the width (W2) of the rib 33 is set to be smaller than the width (W1) of the groove 27 corresponding to the rib 33. Therefore, even if the rib 33 is provided in the counter substrate 30, a distance between a bottom portion of the groove 27 and a tip end of the rib 33 is larger than or equal to the distance (i.e., the fiber diameter of the pulverized glass fiber material 41) between the array substrate 20 and the counter substrate 30, and therefore, a sufficient space is ensured so that the pulverized glass fiber material 41 can exist. This helps to reduce or avoid a situation that the pulverized glass fiber material 41 is stuck due to the rib 33, so that the function of the spacer is impaired and therefore it is difficult to control the cell thickness.

The liquid crystal display device 10 is configured so that when the TFT is turned on in a pixel, a potential difference occurs between the pixel electrode and the common electrode 31, whereby a predetermined voltage is applied to a liquid crystal capacitor formed of the liquid crystal layer 50. In the liquid crystal display device 10, an image is displayed by adjusting the transmittance of external incident light by utilizing the phenomenon that the alignment of liquid crystal molecules varies depending on the magnitude of the applied voltage.

A detailed configuration of the array substrate 20 will be described with reference to FIG. 30, etc. Note that, in FIG. 30, the passivation film 24, the planarization film 25, the third metal, etc. are not shown for ease of illustration of the interconnects, and the first and second metals are shown by solid lines for the sake of convenience.

A large number of the gate lines 21 (scan signal interconnects) extending in parallel to each other and a large number of the source lines 23 (video signal interconnects) extending in parallel to each other are provided on the array substrate 20 in the display region D. The source line 23 and the gate line 21 are insulated from each other in the substrate thickness direction by the gate insulating film 22, and extend in intersecting directions (e.g., at right angles). A TFT (not shown) serving as a switching element is provided in the vicinity of each intersection as viewed from above. The liquid crystal display device 10 has pixels corresponding to the respective TFTs to display an image.

The gate lines 21 are formed of the first metal. The source lines 23 are made of the second metal. The first and second metals are each formed, for example, of a Ti film (thickness: about 30 nm) and a Cu film (thickness: about 100 nm) put on top of the Ti film.

An end portion of each of the gate lines 21 is extended to the non-display region N to be connected to a gate driver (not shown) mounted in the terminal region T. On the other hand, the source lines 23 are each connected to a corresponding one of a large number of source lead lines 23a in the non-display region N. The source lead line 23a is formed of the first metal and is provided in the same layer in which the gate line 21 is provided, and is connected to a source driver (not shown) in the terminal region T. The source line 23 and the source lead line 23a are electrically connected together via a conductive film 23c which is formed of the third metal provided on a surface of a contact hole in a source line contact portion 23b.

As described above, in the array substrate 20, the continuous annular groove 27 is provided in the same layer in which the passivation film 24 and the planarization film 25 are provided, above the first metal, and extends along the gate terminal region Tg in the non-display region N. The groove 27 is formed by providing a hollow portion by developing the planarization film 25 made of photosensitive acrylic resin and performing etching using the developed planarization film 25 as a mask. The groove 27 extends across above the gate lines 21. Because the groove 27 extends across above the first metal, such as the gate lines 21, etc., the material for the alignment film 26 can be reduced or prevented from flowing toward the outside of the substrate during formation of the alignment film 26. Therefore, the distance between the alignment film 26 and the sealing member 40 can be reduced in the picture-frame region along the gate terminal region Tg, resulting in a narrower picture-frame.

Figure 30:
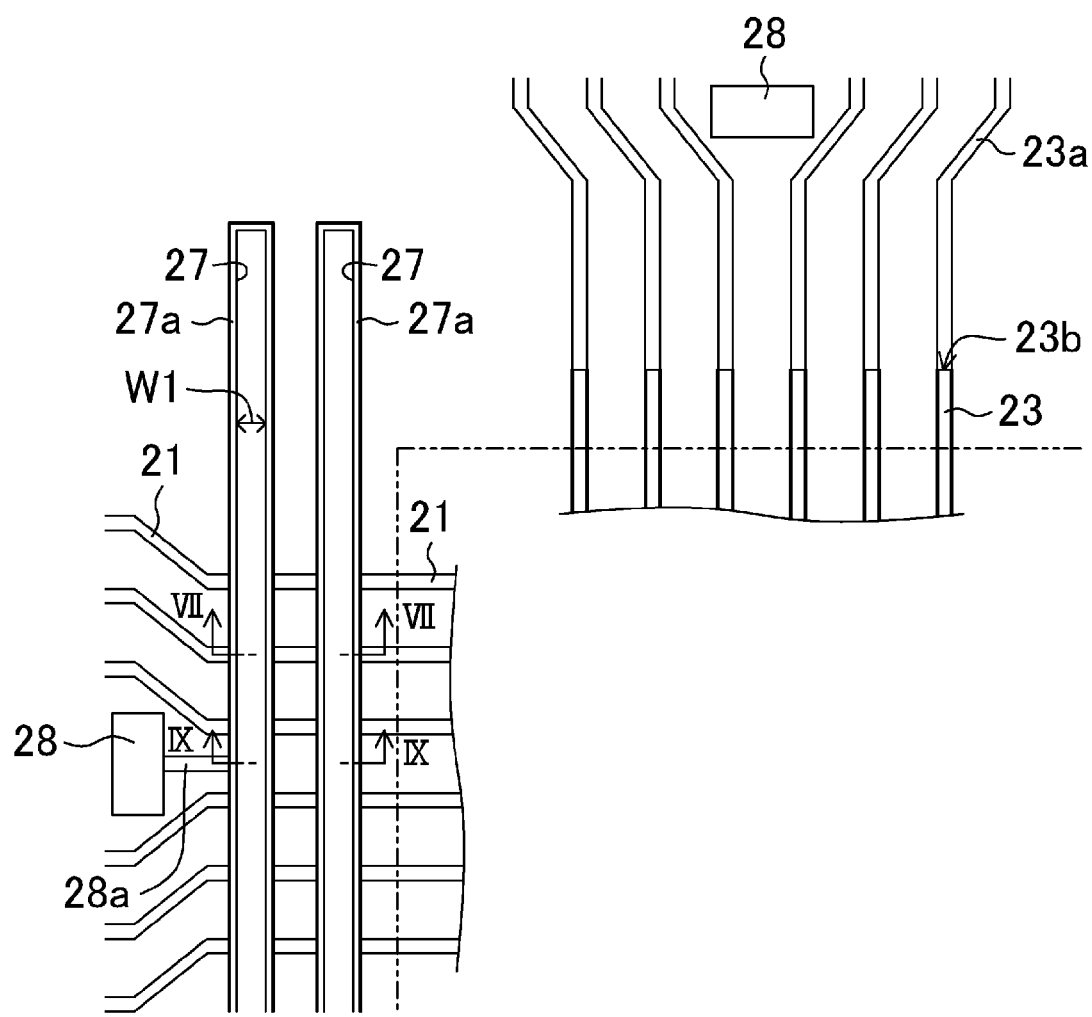
FIG. 30 is an enlarged plan view of a region AR3 of FIG. 28.

As shown in FIG. 30, an underlying metal 27a is provided below the groove 27. The groove 27 and the underlying metal 27a in the array substrate 20 have a cross-sectional view similar to that of the first embodiment of FIG. 7. The underlying metal 27a functions as an etch stopper during formation of the groove 27. The underlying metal 27a has a continuous annular shape extending along the gate terminal region Tg, corresponding to the shape of the groove 27. The underlying metal 27a has a larger width (e.g., about 60 μm) than that of the groove 27. The underlying metal 27a is formed of the second metal. Because the underlying metal 27a is provided below the groove 27, the first metal (the gate line 21, etc.) is not exposed from the surface by etching during formation of the groove 27. Therefore, it is not likely that a short circuit is made between the first metals via a conductive object present on the surface of the groove 27, or that the first metal is exposed from the surface of the groove 27 and is corroded. Even if conduction is established to the underlying metal 27a via a conductive object present on the surface of the groove 27, the underlying metal 27a is not an interconnect which is directly involved in driving of the display device, and therefore, an image defect is not likely to occur. Note that the underlying metal 27a is formed of the second metal and is provided in the same layer in which the source line 23 are formed, and therefore, can be formed simultaneously with the source line 23.

The surface of the groove 27 is covered by a transparent conductive film 27b. The transparent conductive film 27b is formed of the third metal, such as an ITO film, etc. Because the surface of the groove 27 is covered by the transparent conductive film 27b, the underlying metal 27a is not exposed from the surface of the groove 27, and therefore, corrosion of the underlying metal 27a is not likely to occur.

In the array substrate 20, a transfer pad 28 is further provided in the non-display region N. A plurality of the transfer pads 28 are provided around the display region D. The transfer pad 28 is electrically connected to the common electrode 31 provided on the entire surface of the counter substrate 30 via a transfer member interposed between the array substrate 20 and the counter substrate 30. Therefore, if the transfer pad 28 is maintained at a common potential, the common potential can be applied to the common electrode 31. The array substrate 20 including the transfer pad 28 has a cross-sectional view similar to that of the first embodiment of FIG. 9.

The transfer member may be, for example, conductive beads (not shown) contained in the sealing member 40. The conductive bead may be, for example, a plastic with gold plating on a surface thereof.

The transfer pads 28 are connected to a transfer bus line (not shown) which is provided along an outer perimeter of a region in which the transfer pads 28 are provided. The transfer bus line is connected to an external connection terminal. When the common potential is applied to the external connection terminal, the common potential is directly transferred to each transfer pad 28, and then via the transfer member to the common electrode 31 of the counter substrate 30.

As in the first embodiment, as shown in FIG. 30, the transfer pad 28 is electrically connected to the underlying metal 27a via a transfer pad lead line 28a. Here, the outer one of the two underlying metals 27a is connected to the transfer pad 28. Because the transfer pad 28 and the underlying metal 27a are electrically connected to each other, the potential of the underlying metal 27a can be maintained at the same common potential as that of the transfer pad 28. Therefore, even if conduction is established between the common electrode 31 and the underlying metal 27a via the transfer member contained in the sealing member 40, an image defect is not likely to occur due to that conduction. Note that one, some, or all of the transfer pads 28 may be connected via the transfer pad lead line 28a to the underlying metal 27a.

Note that the inner one of the two underlying metals 27a is not connected to the transfer pad 28, and therefore, is not electrically connected to other interconnects, i.e., is in the floating state. Therefore, even if conduction is established between the common electrode 31 and the underlying metal 27a via the transfer member contained in the sealing member 40, an image defect is not likely to occur due to that conduction.

According to the liquid crystal display device 10 of the third embodiment, the groove 27 and the rib 33 are formed in a portion extending along the gate terminal region Tg of the non-display region N, the picture-frame can be narrowed in the portion extending along the gate terminal region Tg. On the other hand, although the picture-frame is not narrowed in a portion extending along the source terminal region Ts of the non-display region N, that picture-frame region can be effectively used, for example, as a space for providing a spare interconnect for repairing the source line 23 that takes a different path in the non-display region N.

The other configurations and advantages are the same as those described in the first embodiment. The examples described in the variations of the first embodiment can be applied to the third embodiment. As in the second embodiment, a plurality of underlying metals 27a may be provided and spaced apart from each other in an island pattern.

The liquid crystal display device 10 of third embodiment can be fabricated by a process similar to that of the first embodiment, except that the picture-frame width of the non-display region N and the layouts of the groove 27 and the rib 33 are different.

Variations of Third Embodiment

Variations of the third embodiment will be described hereinafter.

(Ninth Variation)

Figure 31:
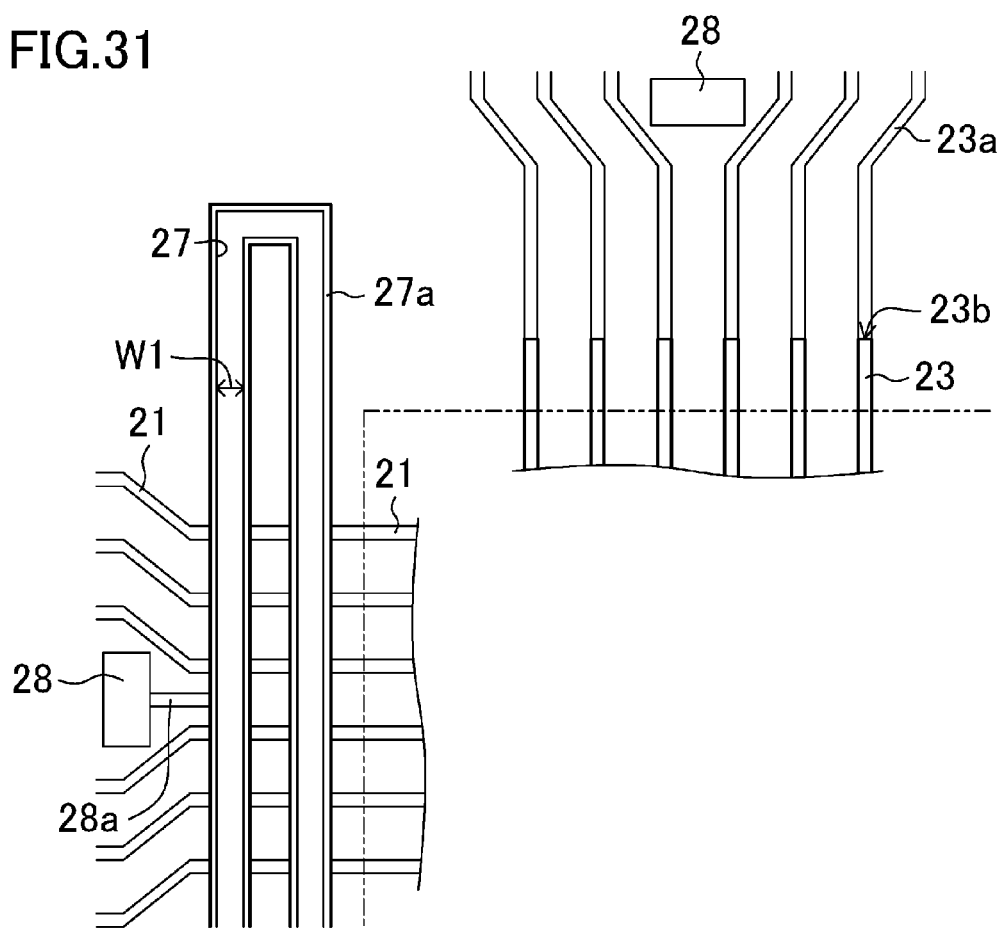
FIG. 31 is an enlarged plan view of a main portion of an array substrate according to a ninth variation of the third embodiment, corresponding to the region AR3 of FIG. 28.
Figure 32:
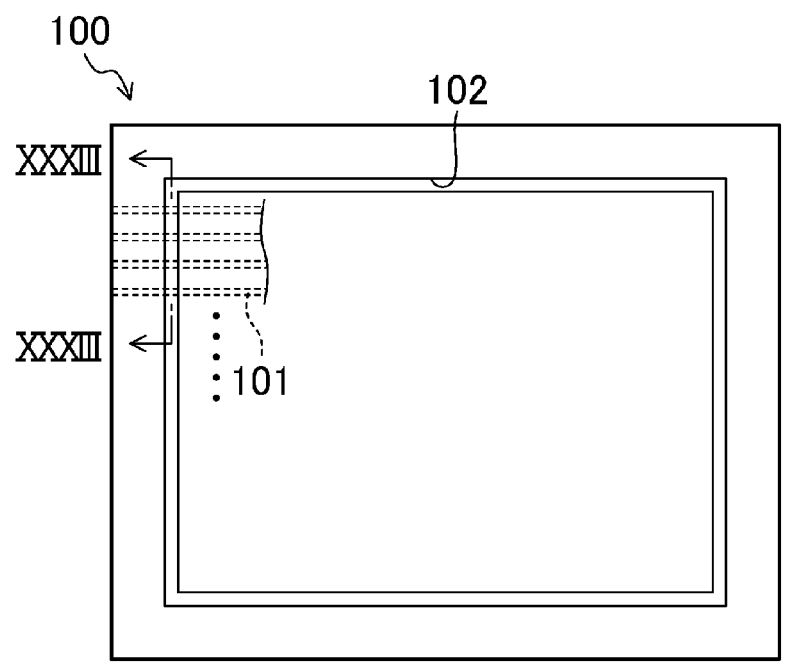
FIG. 32 is a plan view of a liquid crystal display device for describing problems addressed by the present invention.
Figure 33:
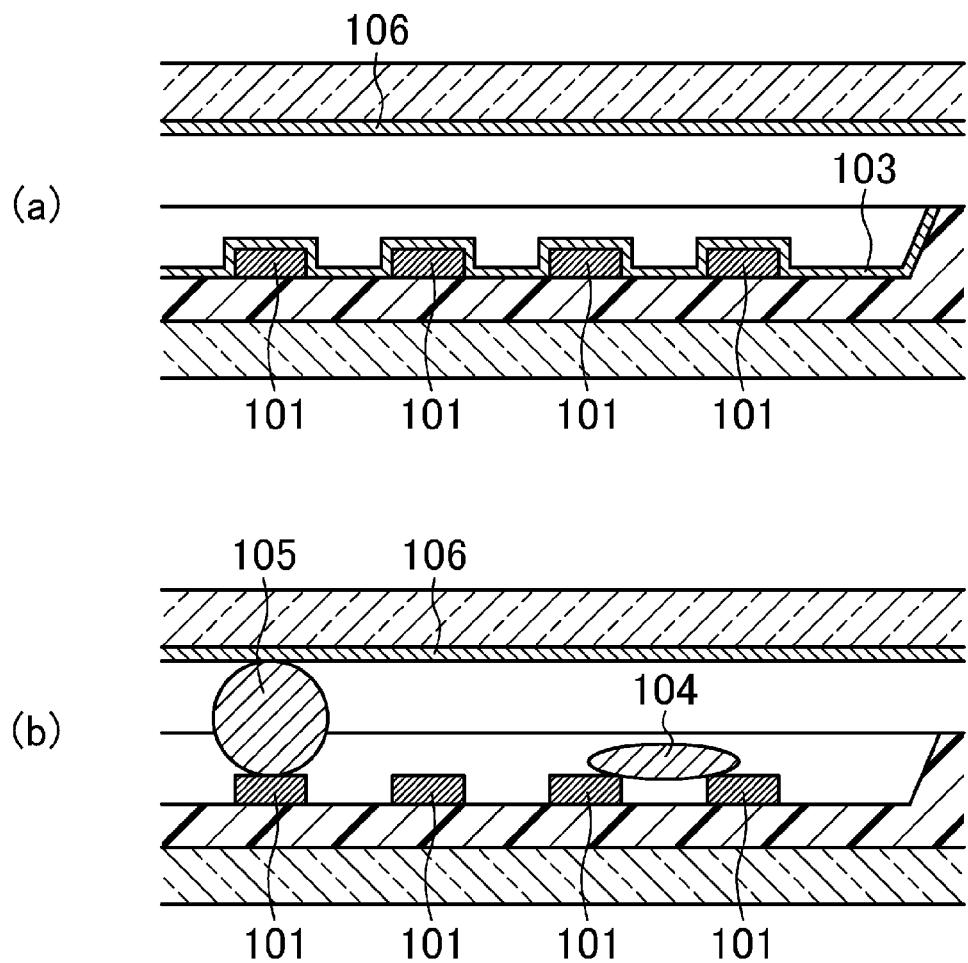
FIGS. 33(a) and (b) are cross-sectional views taken along line XXXIII-XXXIII of FIG. 32.

In the third embodiment, the two grooves 27 are provided in parallel to each other and the two ribs 33 are provided in parallel to each other. End portions of the two grooves 27 or the two ribs 33 may be closed as shown in FIG. 31 (ninth variation).

(Other Variations)

In the third embodiment, the distance between (the length "a" in FIG. 27) between the display region D and the seal region SL in the non-display region N at the longer side of the liquid crystal display device 10 is set to be longer than the distance (the length "b" in FIG. 27) between the display region D and the seal region SL at the shorter side of the liquid crystal display device 10. The distance between (the length "a" in FIG. 27) between the display region D and the seal region SL at the longer side of the liquid crystal display device 10 may be set to be shorter than the distance (the length "b" in FIG. 27) between the display region D and the seal region SL at the shorter side of the liquid crystal display device 10. In this case, if the groove 27 and the rib 33 are formed in the narrower picture-frame (a region along the source terminal region Ts) between the display region D and the seal region SL at the longer side, the alignment films 26 and 32 can be reduced or prevented from flowing to the source terminal region Ts.

Note that if the region along the source terminal region Ts is widened, a spare interconnect can be provided in that region, i.e., the widened region can be effectively used. Therefore, the distance between (the length "a" in FIG. 27) between the display region D and the seal region SL in the non-display region N at the longer side of the liquid crystal display device 10 is preferably set to be longer than the distance (the length "b" in FIG. 27) between the display region D and the seal region SL at the shorter side of the liquid crystal display device 10.

In the third embodiment, the groove 27 and the rib 33 are formed in the regions corresponding to each other. Alternatively, while the groove 27 has an annular shape as in the first embodiment, the rib 33 may extend along the gate terminal region Tg. Alternatively, while the rib 33 has an annular shape as in the first embodiment, the groove 27 may extend along the gate terminal region Tg.

Other Embodiments

In the first to third embodiments, the liquid crystal display device 10 including the liquid crystal display panel has been illustrated as a display device. The present invention is also applicable to display devices, such as a plasma display (PD), a plasma address liquid crystal display (PALC), an organic electroluminescence (organic EL) display, an inorganic electroluminescence (inorganic EL) display, a field emission display (FED), a surface-conduction electron-emitter display (SED), etc.

INDUSTRIAL APPLICABILITY

The present invention is useful for display devices, such as a liquid crystal display device, etc., and particularly, for a control of a region in which an alignment film is applied.

DESCRIPTION OF REFERENCE CHARACTERS

D DISPLAY REGION
Tg GATE TERMINAL REGION
10 DISPLAY DEVICE (LIQUID CRYSTAL DISPLAY DEVICE)
20 FIRST SUBSTRATE (ARRAY SUBSTRATE)
20S SUBSTRATE BODY
21 FIRST GROUP OF INTERCONNECTS (GATE LINES)
22 INSULATING FILM (GATE INSULATING FILM)
23 SECOND GROUP OF INTERCONNECTS (SOURCE LINES)
23a FIRST GROUP OF INTERCONNECTS (SOURCE LEAD INTERCONNECTS)
27 GROOVE
27a UNDERLYING METAL
27b TRANSPARENT CONDUCTIVE FILM (ITO FILM)
27c SILICON FILM
27d Ti FILM
27e Al FILM
28 TRANSFER PAD
30 SECOND SUBSTRATE (COUNTER SUBSTRATE)
33 RIB
50 LIQUID CRYSTAL LAYER

The invention claimed is:

1. A display device wherein
a first substrate and a second substrate are provided, facing each other,
the first substrate includes a substrate body, a first group of interconnects provided on the substrate body and including a gate line and a source lead interconnect that are made of a first metal, and a second group of interconnects provided with an insulating film being interposed between the first and second groups of interconnects and including a source line and an underlying metal that are made of a second metal,
in a display region, the first group of interconnects extending in parallel to each other and the second group of interconnects extending in parallel to each other in a direction intersecting the first group of interconnects are provided, and pixels are provided, corresponding to switching elements each provided in the vicinity of a corresponding one of intersections of the first and second groups of interconnects as viewed from above, to display an image,
on the source lead interconnect of the first substrate, the insulating film, the underlying metal, a passivation film, and a planarization film are sequentially provided in this order,
a groove is provided in a region of the planarization film and the passivation film on a substrate outer perimeter portion including the underlying metal on the source lead interconnect, continuously extending along the substrate outer perimeter portion and across the first group of interconnects,
a contact hole is provided in the source lead interconnect and the insulating film and the passivation film on the second group of interconnects, and
a conductive film is provided on the contact hole electrically connecting the source lead interconnect and the second group of interconnects.

2. The display device of claim 1, wherein
the first substrate has a rectangular shape, and
there are a plurality of the grooves continuously extending in the substrate outer perimeter portion along two sides facing each other of the first substrate.

3. The display device of claim 2, wherein
the first group of interconnects extending in parallel to each other in the display region, of the first group of interconnects, are gate lines, and
regions along the two sides facing each other of a region around the display region of the first substrate are gate terminal regions in which an external connection terminal configured to connect the gate lines to an external circuit is provided.

4. The display device of claim 2, wherein
in the second substrate, a rib protruding toward the first substrate is formed in each of regions along two sides facing each other of the second substrate, and the two sides correspond to the grooves of the first substrate as viewed from above, and
each of the ribs has a protrusion height from a substrate surface which is smaller than or equal to a depth of the corresponding one of the grooves, and a width of each of the ribs which is smaller than a width of the corresponding one of the grooves.

5. The display device of claim 1, wherein
the groove is formed in a continuous annular shape and is provided in the substrate outer perimeter portion to surround the display region.

6. The display device of claim 5, wherein
in the second substrate, an annular rib protruding toward the first substrate and surrounding the display region is formed in a region corresponding to the groove of the first substrate as viewed from above, and
the rib has a protrusion height from a substrate surface which is smaller than or equal to a depth of the groove, and a width of the rib which is smaller than a width of the groove corresponding to the rib.

7. The display device of claim 1, wherein
the underlying metal continuously extends along the substrate outer perimeter portion, corresponding to the groove shape.

8. The display device of claim 7, wherein
a transfer pad configured to apply a common potential to a common electrode provided on a surface of the second substrate is formed in a region other than the display region of the first substrate, and
the underlying metal is electrically connected to the transfer pad.

9. The display device of claim 8, wherein
there are a plurality of the transfer pads, and
the underlying metal is electrically connected to each of the plurality of transfer pads, and is also connected to an external connection terminal to which a common potential is applied.

10. The display device of claim 1, wherein
there are a plurality of the underlying metals, and the plurality of the underlying metals are spaced apart from each other in an island pattern, and correspond to respective regions in which the first group of interconnects and the groove overlap each other as viewed from above.

11. The display device of claim 1, wherein
the underlying metal is not electrically connected to other interconnects and is in a floating state.

12. The display device of claim 1, wherein
a silicon film is provided in a region which is located below the underlying metal and above the insulating film.

13. The display device of claim 1, wherein
the groove surface is covered by a transparent conductive film.

14. The display device of claim 1, wherein
the underlying metal is exposed from the groove surface.

15. The display device of claim 1, wherein
the second group of interconnects are formed of a Ti film and a Cu film put on top of the Ti film.

16. The display device of claim 1, wherein
the second group of interconnects are formed of a Ti film and an Al film put on top of the Ti film.

17. The display device of claim 1, wherein
a liquid crystal layer is provided between the first and second substrates.

* * * * *